US006456450B1

(12) United States Patent
Lu et al.

(10) Patent No.: US 6,456,450 B1
(45) Date of Patent: Sep. 24, 2002

(54) METHOD AND APPARATUS FOR REDUCING TRACK MISREGISTRATION DUE TO DIGITAL-TO-ANALOG CONVERTER QUANTIZATION NOISE

(75) Inventors: Wei-Min Lu, San Jose; Roger William Wood, Gilroy; Mantle Man-Hon Yu, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/205,803

(22) Filed: Dec. 4, 1998

(51) Int. Cl.[7] .............................................. G11B 5/596
(52) U.S. Cl. .................................................. 360/77.02
(58) Field of Search ............................ 360/77.02, 32, 360/39; 341/118, 131, 142–145

(56) References Cited

U.S. PATENT DOCUMENTS

| | | | |
|---|---|---|---|
| 2,927,962 A | | 3/1960 | Cutler |
| 4,644,324 A | | 2/1987 | Araki et al. |
| 4,893,066 A | | 1/1990 | Stewart et al. |
| 4,996,530 A | | 2/1991 | Hilton |
| 5,155,422 A | * | 10/1992 | Sidman et al. ............... 318/560 |
| 5,270,880 A | | 12/1993 | Ottesen et al. |
| 5,396,379 A | | 3/1995 | Mayo |
| 5,444,583 A | | 8/1995 | Ehrlich et al. |
| 5,511,052 A | | 4/1996 | Perry |
| 5,602,874 A | * | 2/1997 | Luz et al. .................... 375/243 |
| 5,610,487 A | | 3/1997 | Hutsell |
| 5,909,661 A | * | 6/1999 | Abramovitch et al. .................... 360/77.04 X |

FOREIGN PATENT DOCUMENTS

| | | | |
|---|---|---|---|
| EP | 0 881 626 A1 | 12/1998 | ............ G11B/5/00 |
| WO | WO96/25809 A1 | 8/1996 | |

OTHER PUBLICATIONS

Abramovitch, D. et al., "Decomposition of Baseline Noise Sources in Hard Disk Position Error Signals Using the PES Pareto Method", Proceedings of the American Control Conference, Albuquerque, NM, 5:2901–2905 (Jun. 4–6, 1997).

Abramovitch, D. et al., "The PES Pareto Method: Uncovering the Strata of Position Error Signals", Proceedings of the American Control Conference, Albuquerque, NM, 5:2888–2895 (Jun. 4–6, 1997).

"Demodulator Noise Reduction for Phase—Encoded Servo Pattern", IBM® Technical Disclosure Bulletin, 33(9):307–308 (Feb. 1991).

(List continued on next page.)

Primary Examiner—David Hudspeth
Assistant Examiner—K. Wong
(74) Attorney, Agent, or Firm—Altera Law Group, LLC

(57) ABSTRACT

A method and apparatus for reducing track misregistration due to digital-to-analog converter quantization noise. In hard disk drive (HDD) servo control systems, quantization noises (or roundoff errors) due to the finite precision of the D/A converter (DAC) driving the VCM contribute a significant portion of the total track-misregistration (TMR). The present invention provides a quantization error feedback (QEF) technique to reduce TMR due to DAC quantization noises. The QEF technique according to the present invention offers a simple method of reshaping the spectrum of this noise to minimize its contribution to TMR. In the digital signal processor (DSP) implementation of the QEF schemes, the quantization error is monitored and accumulated in the DSP; when sufficient error has accumulated, the MSB feeding the DAC are modified such as to cancel the effect of the error. In addition, or alternatively, a state estimator may be driven with the most significant bits and a position error signal to reduce the power spectrum density function of the track misregistration at predetermined frequencies.

51 Claims, 23 Drawing Sheets

OTHER PUBLICATIONS

"Disk Drive Servo Control in the Presence of Magnetic Defects", IBM® Technical Disclosure Bulletin, 32(10B):291–293 (Mar. 1990).

Spang, III, H.A. et al., "Reduction of Quantizing Noise by Use of Feedback", IRE Transactions on Communications Systems, CS–10:373–380 (Dec. 1992).

* cited by examiner

US 6,456,450 B1

METHOD AND APPARATUS FOR REDUCING TRACK MISREGISTRATION DUE TO DIGITAL-TO-ANALOG CONVERTER QUANTIZATION NOISE

BACKGROUND OF THE INVENTION

1. Field of the Invention

This invention relates in general to a rotatable storage systems, and more particularly to a method and apparatus for reducing track misregistration due to digital-to-analog converter quantization noise.

2. Description of Related Art

Rotatable disk data storage systems are widely used in computer systems to provide rapid data file access for reading and writing. These rotating data storage systems include disk memory media using servo-actuator driven transducer assemblies that are driven by voice coil motors (VCM) to access rotating platters. Rotating disk storage systems also include optical disk memory employing a laser read-write head assembly to access optical disks.

The reading and writing information to the concentric data tracks in a rotating storage device is subject to data errors arising from head tracking errors that occur during data storage to the file and during data retrieval from the files. For example, one method known in the art for reducing both hard and soft errors during writing and reading from a storage disk is to define a track centerline and establish limited offtrack regions about each track centerline on the disk. The offtrack method provides a threshold measure for inhibiting the read or write functions of the head assembly. That is, the write function is inhibited (disabled) when the head position exits the offtrack regions.

Nevertheless, in hard disk drives (HDD), the digital to analog converter (DAC) driving the voice coil motor (VCM) has limited accuracy. Quantization noises (or roundoff errors) due to the finite precision of the DAC can disturb the servo control loop and degrade servo performance. In the digital servo control loop, the internal precision of the digital signal processor (DSP) is typically higher (e.g., 16 bits) than that of the DAC (e.g., 12 bits). As a result, the lower order bits have to be dropped when the calculated control signal is sent to the DAC. This dropping of the lower order bits, i.e., the DAC quantization noise, may contribute a significant portion of the total track-misregistration (TMR). Furthermore, for fixed mechanics and servo bandwidth in a HDD, the power spectrum of TMR due to DAC noises is fixed, and the TMR does not scale with the track density.

It can be seen then that there is a need for a method that effectively reduces TMR due to DAC quantization noise.

SUMMARY OF THE INVENTION

To overcome the limitations in the prior art described above, and to overcome other limitations that will become apparent upon reading and understanding the present specification, the present invention discloses a method and apparatus for reducing track misregistration due to digital-to-analog converter quantization noise.

The present invention solves the above-described problems by providing a quantization error feedback method that compensates for the dropping of lower order bits from a processor to a digital-to-analog converter driving a plant.

A method in accordance with the principles of the present invention includes providing control signals for controlling a plant, the control signals each having a precision of a first predetermined number of bits further comprising a first group of most significant bits and at least one least significant bit, providing each of the first group of most significant bits to the plant to control operation of the plant, accumulating the at least one least significant bit until a new most significant bit is generated and adding the new most significant bit to a first group of most significant bits before being provided to the plant.

Other embodiments of a method in accordance with the principles of the invention may include alternative or optional additional aspects. One such aspect of the present invention is that the accumulating the at least one least significant bit until a new most significant bit is generated further comprises feeding the at least one least significant bit through a feedback loop having a feedback loop gain until the new most significant bit is generated.

Another aspect of the present invention is that feedback loop gain is $z^{-1} F(z)$, where $F(z)$ is a filter whose transfer function is assumed to be a real rational function which is analytic and bounded in $\{z: \|z\| \geq 1\}$.

Another aspect of the present invention is that the feedback loop gain is a single integrator.

Another aspect of the present invention is that the feedback loop gain is a double integrator.

Another aspect of the present invention is that the filter $F(z)$ provides a power spectrum $S_{GQE}(\omega)$ of shaped noise that always satisfies $$\frac{1}{\pi} \cdot \int_0^\pi \ln(S_{GQE}(\omega))d\omega = K,$$

where K is a constant.

Another aspect of the present invention is that the control error is track misregistration, the track misregistration being measured according to a position error signal (PES), the mean square value of PES satisfying $$E(PES^2(t)) \geq \frac{q^2}{12} \cdot h_0^2,$$

where $q=2^l c$ with c being the quantization resolution in the processor, and l being a number representing the at least one least significant bit.

Another aspect of the present invention is that the control error is track misregistration, the track misregistration being measured according to a position error signal (PES), a minimum of the mean square value of PES being derived according to a method including constructing state space matrices $B_2$, $D_2$, A, and B, solving $ALA^T - L + BB^T = 0$ to get the solution $$L = \begin{bmatrix} L_{11} & L_{12} \\ L_{21} & L_{22} \end{bmatrix},$$

finding the optimal filter coefficients: $f^* = C_2 L_{12} L_{11}^{-1}$ and solving for the minimum of the mean square value of PES given by:

$$\min_f E(PES^2(t)) = \frac{q^2}{12}(C_2(L_{22} - L_{12}L_{11}^{-1}L_{21})C_2^T + h_0^2).$$

Another aspect of the present invention is that the mean square value of PES achieves the lower bound, $$\frac{q^2}{12} \cdot h_0^2,$$

by additionally feeding forward the filtered QEF noise QN to the controller input when there is at least one sampling delay in the servo loop.

Another aspect of the present invention is that the method further includes driving a state estimator with the most significant bits and a position error signal to reduce the power spectrum density function of the track misregistration at predetermined frequencies. The quantization error feedback method and the state estimator method may be used separately, or alternatively, may be used jointly to achieve even more track misregistration than if either is used separately.

In another embodiment of the present invention the method includes providing control signals for controlling a plant, the control signals each having a precision of a first predetermined number of bits further comprising a first group of most significant bits and at least one least significant bit and driving a state estimator with the most significant bits and a position error signal to reduce the power spectrum density function of the track misregistration at predetermined frequencies.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for reducing track misregistration due to digital-to-analog converter quantization noise. In hard disk drive (HDD) servo control systems, quantization noises (or roundoff errors) due to the finite precision of the D/A converter (DAC) driving the VCM contribute a significant portion of the total track-misregistration (TMR). The present invention provides a quantization error feedback (QEF) technique to reduce TMR due to DAC quantization noises. The QEF technique according to the present invention offers a simple method of reshaping the spectrum of this noise to minimize its contribution to TMR. In the digital signal processor (DSP) implementation of the QEF schemes, the quantization error is monitored and accumulated in the DSP; when sufficient error has accumulated, the MSB feeding the DAC are modified such as to cancel the effect of the error. Despite the nomenclature used herein, QEF is effectively a feedforward technique which means that it cannot affect or degrade the servo loop response.

Figure 1:
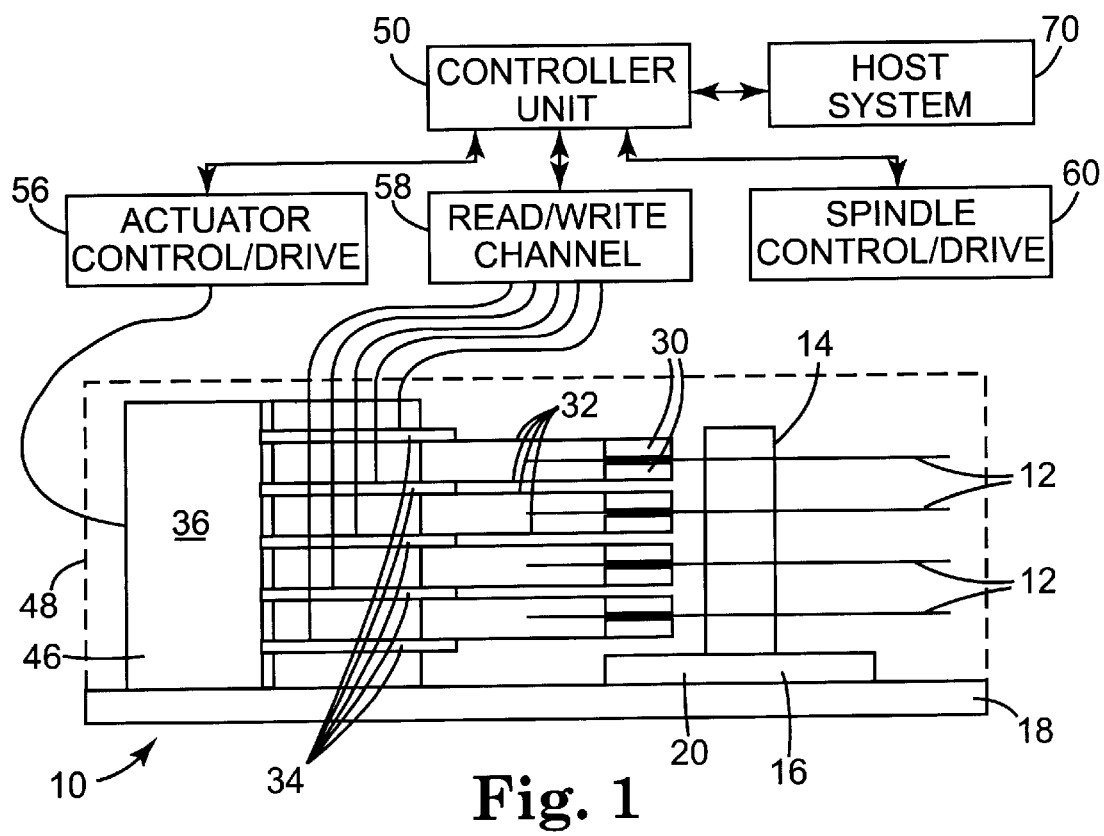
FIG. 1 illustrates a schematic diagram of a data storage system suitable for practicing the present invention.

FIG. 1 shows a schematic diagram of a data storage system 10 suitable for practicing the present invention. System 10 includes a plurality of magnetic recording disks 12. Each disk has a plurality of concentric data tracks. Disks 12 are mounted on a spindle motor shaft 14 which is connected to a spindle motor 16. Motor 16 is mounted to a chassis 18. The disks 12, spindle 14, and motor 16 include a disk stack assembly 20.

A plurality of sliders 30 having read/write heads are positioned over the disks 12 such that each surface of the disks 12 has a corresponding slider 30. Each slider 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically includes a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The sliders 30, suspensions 32, arms 34, and actuator 36 include an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central a processing unit (CPU), memory unit and other digital circuitry. Controller 50 is connected to an actuator control/drive unit 56 which in turn is connected to actuator 36. This allows controller 50 to control the movement of sliders 30 over disks 12. The controller 50 is a connected to a read/write channel 58 which in turn is connected to the heads of the sliders 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request that digital data be read from disks 12 and sent to the system 70. The basic operation of DASD units is well known in the art and is described in more detail in Magnetic Recording Handbook, C. Dennis Mee and Eric D. Daniel, McGraw Hill Book Company, 1990.

Figure 2:
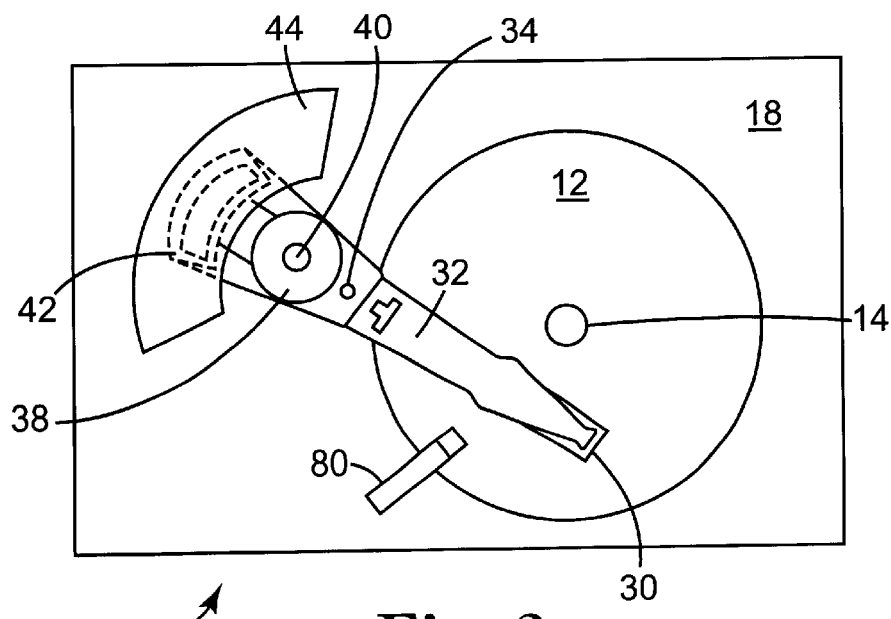
FIG. 2 shows top view of the system illustrated in FIG. 1.

FIG. 2 shows top view of system 10. A loading ramp member 80 is located at the edge of the disk stack assembly 20. Member 80 automatically unloads the sliders 30 from the disks 12 as actuator 36 moves the sliders 30 to the outer disk position. To unload a slider or head means to move it a vertical distance away from its corresponding disk surface. The ramp 80 is optional. Alternatively, the sliders 30 may be placed permanently in the loaded position between the disks. Furthermore, those skilled in the art will recognize that the above magnetic storage system is present for illustration only and that the present invention is not meant to be limited to magnetic storage systems, but that the present invention is applicable to other types of storage systems, e.g., optical storage systems. Moreover, herein a plant being driven by a digital signal processor (DSP) will be described as being a voice coil motor. However, those skilled in the art will recognize that the present invention is not meant to be limited to applications involving a voice coil motor but is equally applicable to other types of plants, e.g., a spindle motor or actuator.

Figure 3:
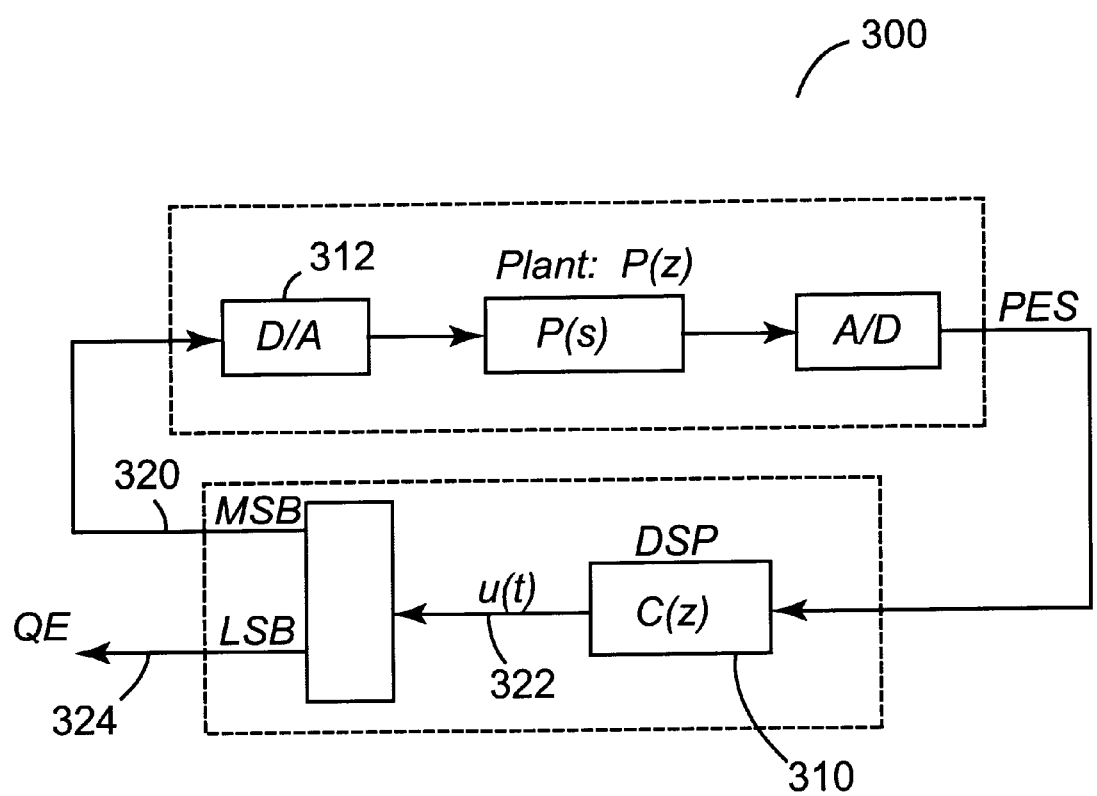
FIG. 3 illustrates a simplified block diagram of a HDD servo system.

FIG. 3 illustrates a simplified block diagram 300 of a HDD servo system. In this system, the microprocessor (DSP) 310 has higher precision than the D/A converter (DAC) 312 does. Therefore, only the most significant bit (MSB) part 320 of the calculated control signal 322 is sent to the D/A converter 312, the least significant bit (LSB) part 324 is truncated (rounded off). The error (LSB) 324 due to the DAC truncation is referred as DAC quantization error (noise), denoted as QE herein.

The quantization noise QE(t) 324 can be viewed as a white random process having a uniform probability density in $[-q/2, q/2]$, where $q=2^l c$ with c being the quantization resolution in DSP, and l being the number of LSB bits. The mean value for the quantization error is:

$$E(QE(t))=0,$$

and its variance satisfies $$\delta_{QE}^2 = E\{(QE - E(QE))^2\} = \frac{q^2}{12},$$

which is the mean square value of the quantization noise. The auto-correlation function is given as follows, $$R_{QE}(\tau) = E\{QE(t)QE(t+\tau)\} = \frac{q^2}{12},$$

if $\tau=0$; otherwise $R_{QE}(\tau)=0$. Power density spectrum is given as follows:

$$S_{QE}(\omega) = \sum_{\tau=-\infty}^{\infty} R_{QE}(\tau)e^{-i\tau\omega} = R_{QE}(0) = \frac{q^2}{12}.$$

Therefore, the power of the DAC quantization noise is evenly distributed on all frequency ranges.

Figure 4:
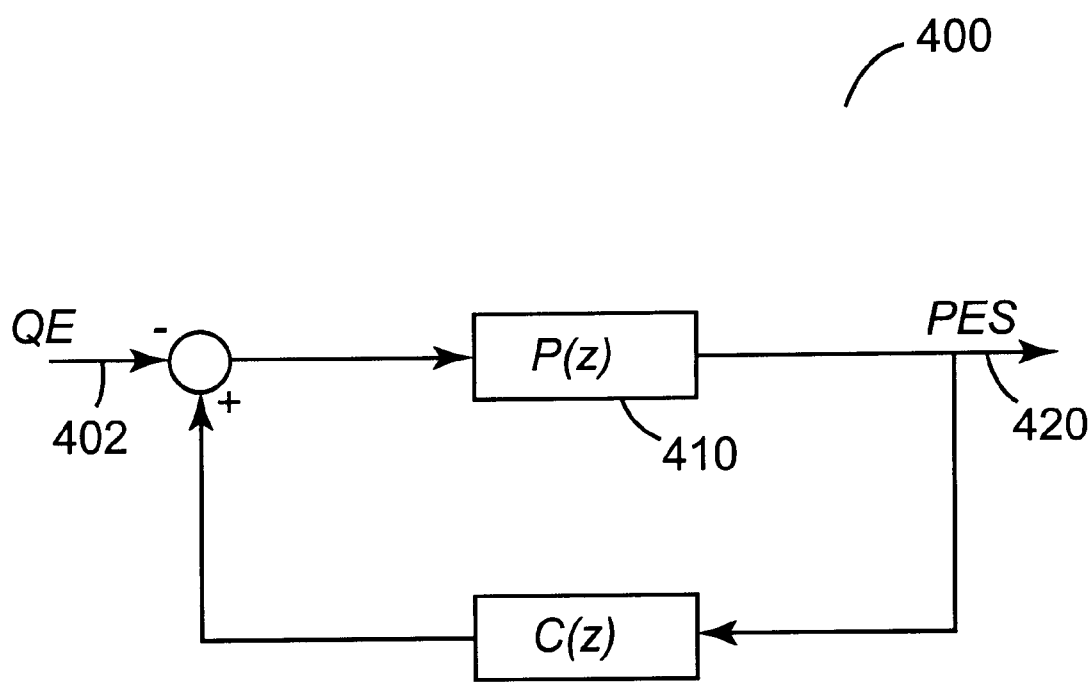
FIG. 4 is an equivalent circuit of the block diagram illustrated in FIG. 3.

The block diagram 300 in FIG. 3 can be redrawn as the block diagram 400 in FIG. 4. Therefore, the TMR due to quantization error of D/A can be represented by $$PES(z)=H(z) \cdot QE(z),$$

where H(z) is the (closed loop) transfer function from QE to PES:

$$H(z) = \frac{-P(z)}{1 - P(z)C(z)},$$

P(z) 410 is the transfer function of the plant, which is dominated by a double-integrator. Thus, assuming the transfer function P(z) 410 is a double integrator, in the following, the magnitude of TMR or position error signal (PES) 420 is measured by its mean square value (or variance), which can be represented by $$E(PES^2(t)) = \frac{1}{\omega_n} \int_0^{\omega_n} S_{PES}(\omega)d\omega,$$

where $\omega_n$ is the Nyquist frequency, which is normalized as Therein. Thus, the mean square value of TMR is the average power of the signal, which is determined by its power spectrum density function. The power spectrum density function of PES is then represented by:

$$S_{PES}(\omega)=\|H(e^{i\omega})\|^2 S_{QE}(\omega),$$

Therefore, the power spectrum of the TMR is dependent on the frequency response of the transfer function from QE 402 to PES 420 and the power spectrum of the quantization noise. In particular, if the quantization noise is represented as white noise as discussed in the previous subsection, then the shape of power spectrum of TMR depends solely on the frequency response of the system:

$$S_{PES}(\omega) = \|H(e^{j\omega})\|^2 \frac{q^2}{12}.$$

Figure 5:
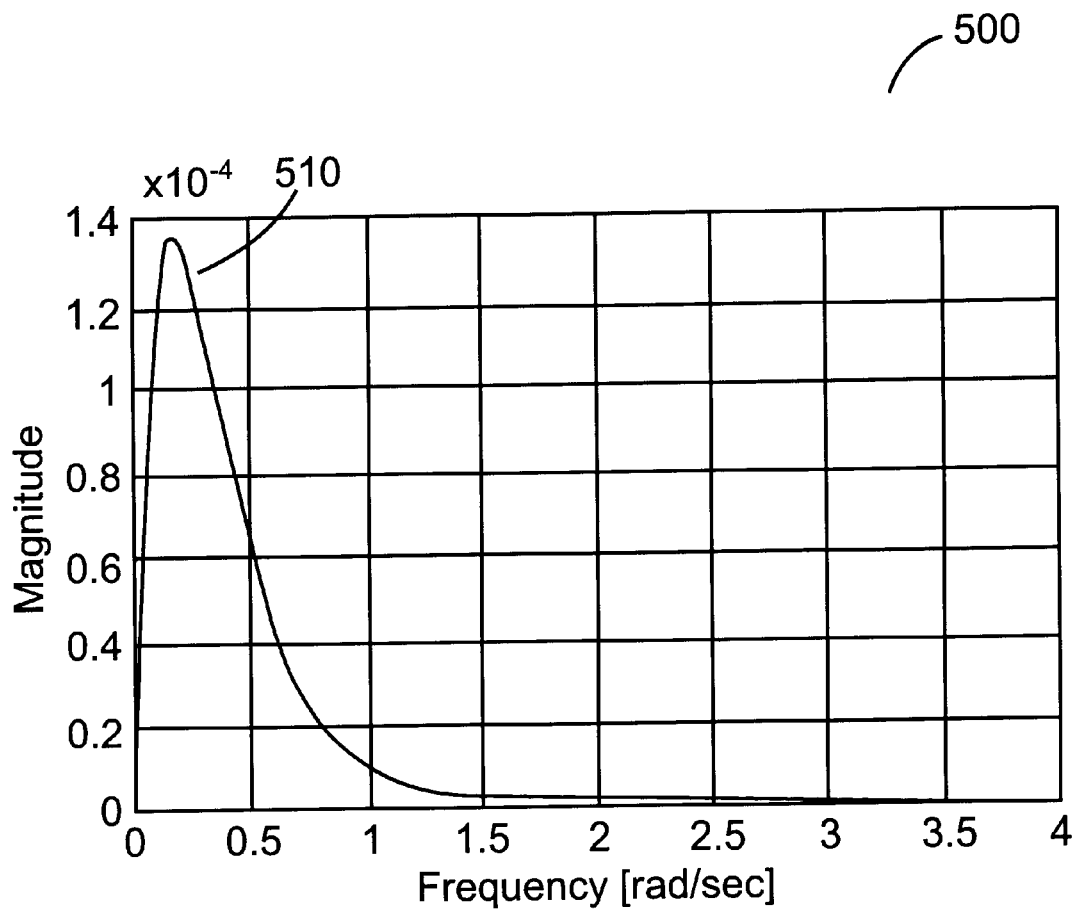
FIG. 5 shows the frequency response from quantization error to TMR.

The typical frequency response of the closed loop system from QE 402 to PES 420 has a shape of a low pass filter. FIG. 5 shows the frequency response 500 from quantization error to TMR. Thus, the power of TMR due to DAC quantization noise 510 is concentrated at lower frequencies.

Therefore, referring to FIG. 4, the reduction of the average power of PES 420 can be achieved by reshaping the power spectrum density function of TMR, or changing either the frequency response of the closed loop transfer function or the power spectrum of the input noise. Since any alteration of the frequency response of the closed loop transfer function may degrade other desired properties of the servo systems, desirable techniques for TMR reduction should be those that are able to reshape the power spectrum of the input noise QE 402 and reduce the average power of PES 420 in the frequency range of interest. The method and apparatus according to the present invention reduces the power at the lower frequencies.

Figure 6:
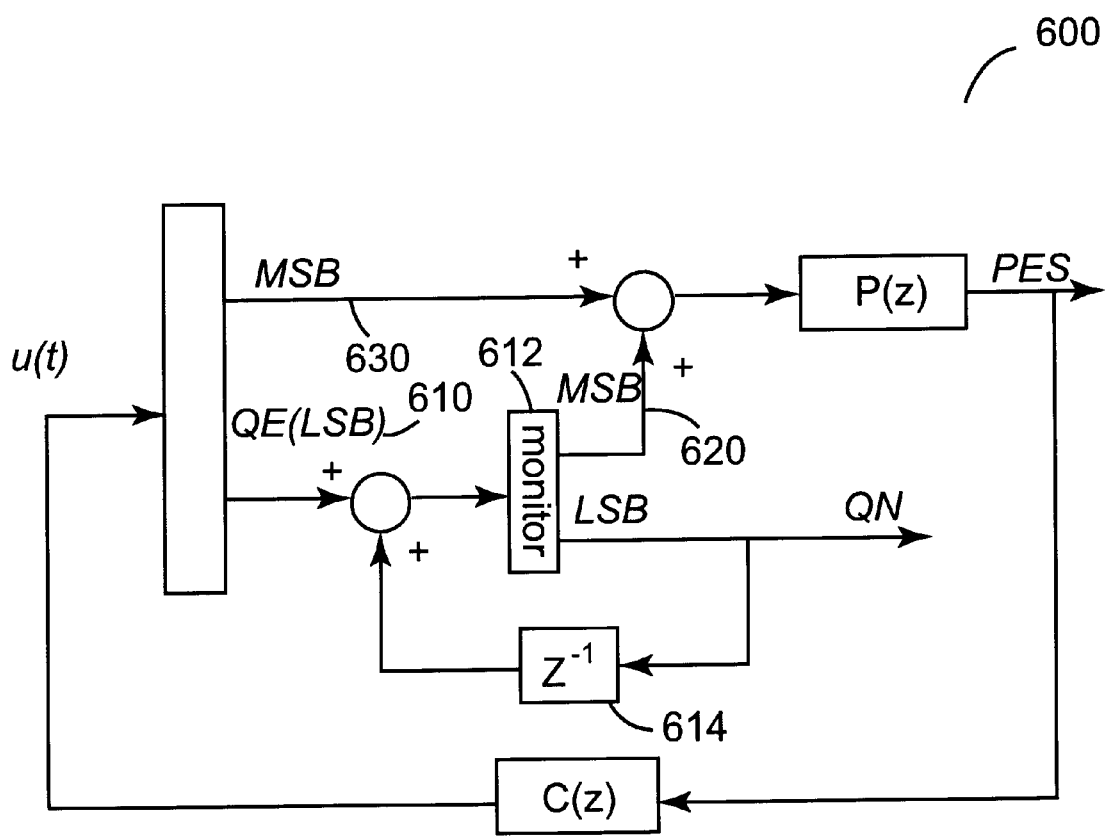
FIG. 6 illustrates a block diagram of a quantization error feedback (QEF) circuit according to the present invention.

The principle of QEF is illustrated with the block diagram 600 in FIG. 6. With this technique, the quantization (or roundoff) error 610 is monitored 612 and accumulated 614 (integrated) in the DSP. When sufficient error has accumulated, i.e., an MSB is generated 620, and the generated MSB 620 is added to the original MSB 630 feeding the DAC. Note that in the first embodiment of the QEF scheme according to the present invention, the QE signal 610 is integrated once. Hereinafter, this scheme will be referred to as the single-integrator QEF.

Figure 7:
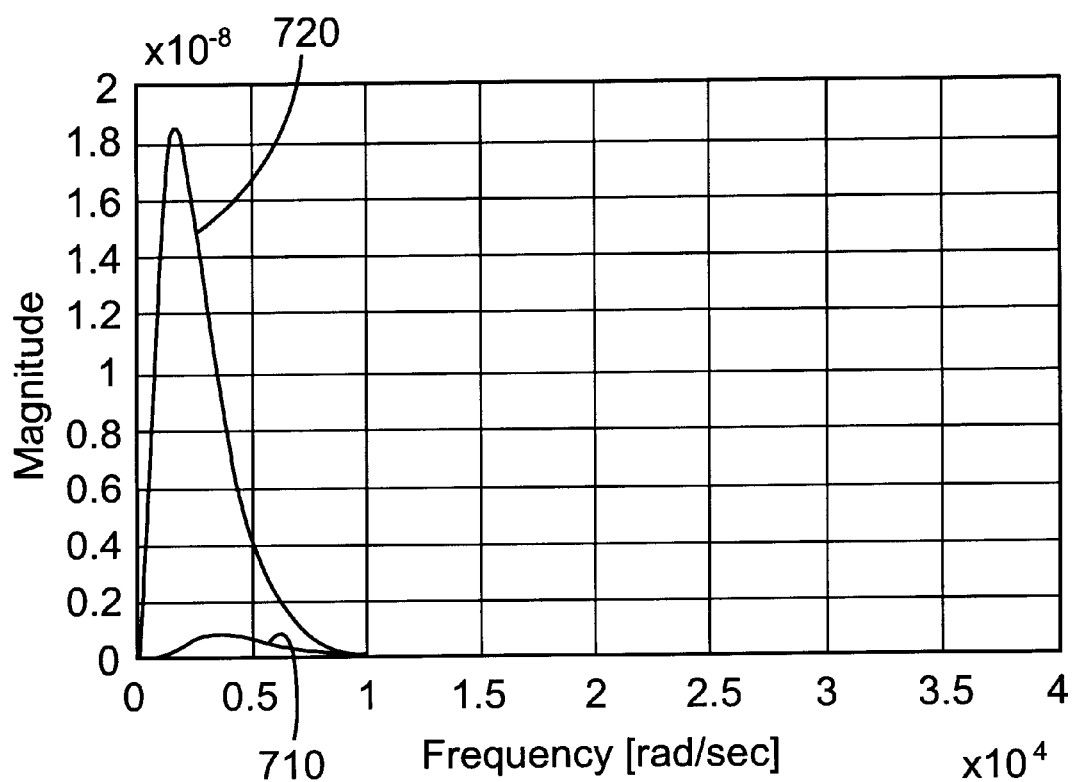
FIG. 7 shows the ideal power spectrums of TMR due to quantization error with single-integrator QEF (lower curve) and without any QEF (upper curve), respectively.

FIG. 7 shows the ideal power spectrums of TMR due to quantization error with single-integrator QEF (lower curve) 710 and without any QEF (upper curve) 720, respectively. The TMR reduction is significant. In fact, if there is no QEF, then the mean square value of $$\text{TMR is } 1.5827 \times 10^{-9} \cdot \frac{q^2}{12},$$

while with single-integrator QEF, the mean square value of $$\text{TMR is } 1.0965 \times 10^{-10} \cdot \frac{q^2}{12}.$$

Figure 8:
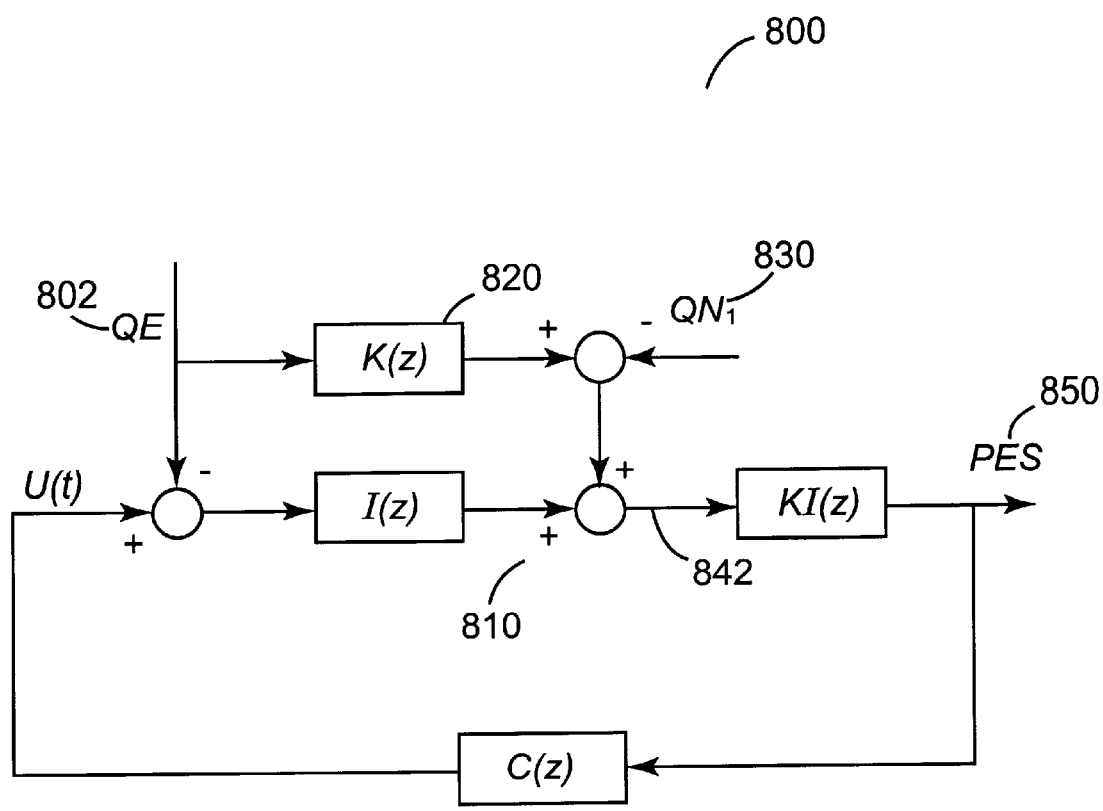
FIG. 8 is an equivalent circuit of the block diagram illustrated in FIG. 6 wherein the double-integrator plant is decomposed into two integrators.

To help explain the QEF technique, the QEF scheme discussed earlier with references to FIG. 6 is equivalently (but unrealistically) represented as the block diagram 800 in FIG. 8. In this block diagram 800, the double-integrator plant is decomposed into two integrators: $P(z)=kI^2(z)$810, and $K(z)=I(z)$ 820, where $I(z)$ is a discrete-time integrator:

$$I(z) = \frac{1}{1-z^{-1}}.$$

$QN_1$ 830 can also be interpreted as the truncation error (LSB) of QE after integration in the above block diagram; as the internal signal 842 driving the block $kI(z)$ should be MSB. Note that $QN_1$ 830 is exactly the same signal as $QN_1$ 510 in the block diagram 500 of FIG. 5. In the following analysis, $QN_1$ 810 is white noise with the similar stochastic properties as discussed above, in particular, $$S_{QN_1}(\omega) = S_{QE}(\omega) = \frac{q^2}{12}.$$

The control scheme shown in the block diagram 800 is actually feedforward control which does not alter closed loop transfer function. As the prefilter $K(z)$ 820 in this case is a single discrete time integrator.

In the following discussion, the QEF technique 400 in FIG. 4 will be referred to as single integrator QEF. In fact, the single integrator QEF is an optimal feedforward control scheme in the sense that the prefilter $K(z)=I(z)$ in FIG. 8 is optimally chosen such that the resulting PES 850 has minimal value with the given structure. To see this, PES is represented as follows:

$$PES(z) = \frac{kK(z)I(z) - P(z)}{1 - P(z)C(z)} QE(z) + \frac{kI(z)}{1 - P(z)C(z)} QN_1(z).$$

As QE 802 and $QN_1$ 830 can be viewed as two independent white noises, the power spectrum density function of PES can be represented as:

$$S_{PES}(\omega) = \left\| \frac{kK(e^{j\omega})I(e^{j\omega}) - P(e^{j\omega})}{1 - P(e^{j\omega})C(e^{j\omega})} \right\|^2 S_{QE}(\omega) + \left\| \frac{kI(e^{j\omega})}{1 - P(e^{j\omega})C(e^{j\omega})} \right\|^2 S_{QN_1}(\omega).$$

Therefore, the mean square value of PES 850 is $$E(PES^2(t)) = \frac{1}{\pi}\int_0^\pi S_{PES}(\omega)d\omega = \frac{1}{\pi}\int_0^\pi \left( \left\| \frac{kK(e^{j\omega})I(e^{j\omega}) - P(e^{j\omega})}{1 - P(e^{j\omega})C(e^{j\omega})} \right\|^2 S_{QE}(\omega) + \left\| \frac{kI(e^{j\omega})}{1 - P(e^{j\omega})C(e^{j\omega})} \right\|^2 S_{QN_1}(\omega) \right) d\omega = \frac{q^2}{12\pi}\int_0^\pi \left\| \frac{kK(e^{j\omega})I(e^{j\omega}) - P(e^{j\omega})}{1 - P(e^{j\omega})C(e^{j\omega})} \right\|^2 d\omega + \frac{q^2}{12\pi}\int_0^\pi \left\| \frac{kI(e^{j\omega})}{1 - P(e^{j\omega})C(e^{j\omega})} \right\|^2 d\omega.$$

It is noticed that the second term in the above is independent of the prefilter $K(z)$ 820; and the non negative first term takes the minimal value 0 if $$\left\| \frac{kK(e^{j\omega})I(e^{j\omega}) - P(e^{j\omega})}{1 - P(e^{j\omega})C(e^{j\omega})} \right\|^2 = 0,$$

which is achieved by $kK(z)I(z)=P(z)$ or $K(z)=I(z)$. In this case, the mean square value of PES 850 takes minimal value, which is $$\min_{K(z)} E(PES^2(t)) = \frac{q^2}{12\pi}\int_0^\pi \left\| \frac{kI(e^{j\omega})}{1 - P(e^{j\omega})C(e^{j\omega})} \right\|^2 d\omega.$$

Figure 9:
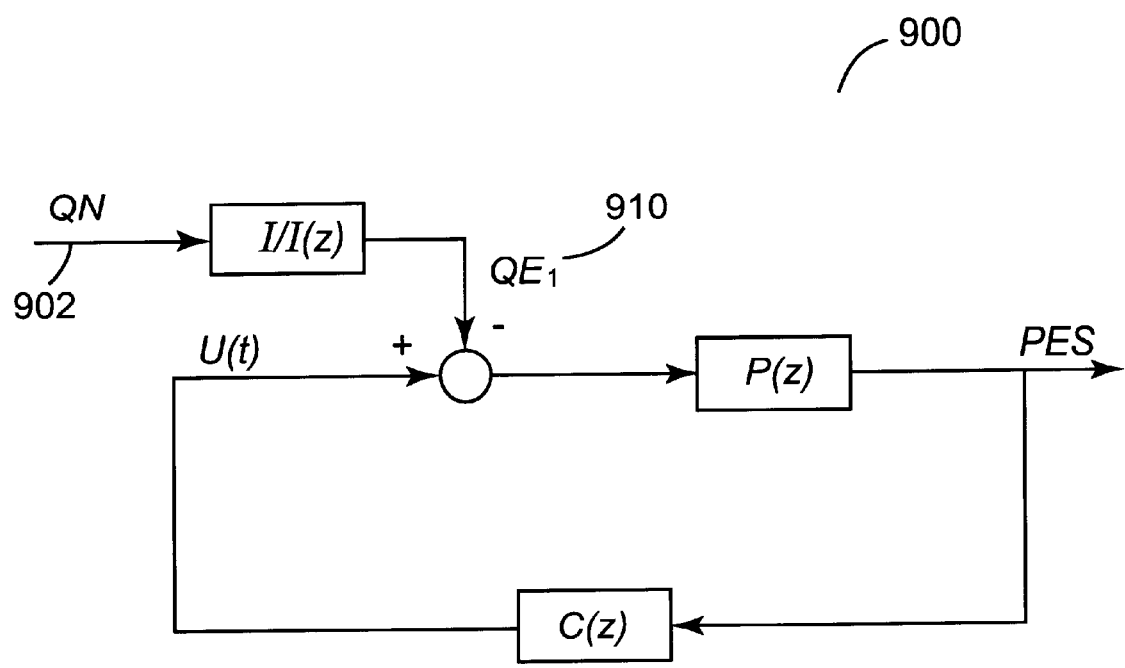
FIG. 9 is an equivalent circuit of the block diagram illustrated in FIG. 8.

The block diagram 800 in FIG. 8 is equivalent to the block diagram 900 in FIG. 9. Comparing this block diagram 900 with block diagram 400 FIG. 4, one can easily see that the disturbance entering the system becomes:

$$QE_1(z) = \frac{QN(z)}{I(z)} = (1-z^{-1})QN(z);$$

i.e., the quantization noise QN 902 is reshaped by the filter which is now a discrete-time differentiator. The power spectrum density of the filtered disturbance $QE_1$ 910 is as follows:

$$S_{QE_1}(\omega) = \|1-e^{-j\omega}\|^2 S_{QE}(\omega) = 4\sin^2\left(\frac{\omega}{2}\right)\cdot\frac{q^2}{12}.$$

Figure 10:
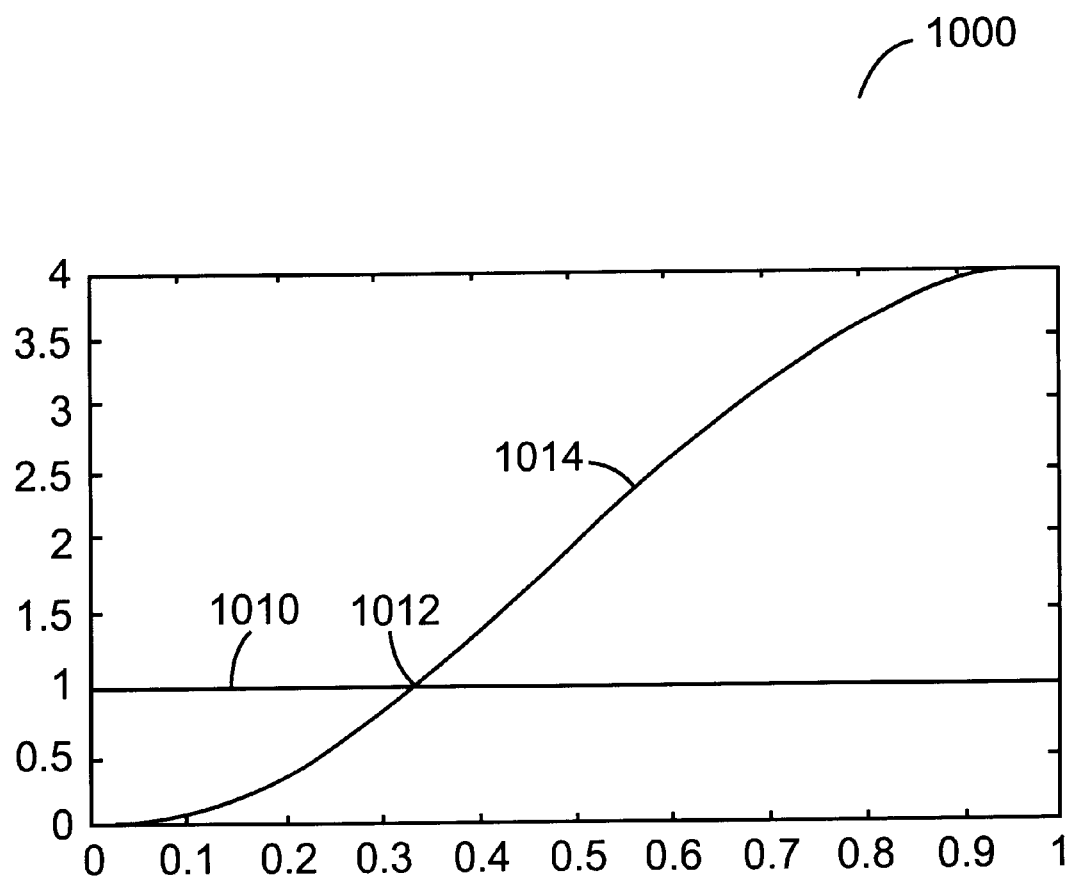
FIG. 10 illustrates the power spectrum density of the filtered disturbance $QE_1$ of FIG. 9.

FIG. 10 illustrates the power spectrum density 1000 of the filtered disturbance $QE_1$ 910 of FIG. 9. From this figure, the filtering process can be observed as reducing the power at the lower frequencies 1010 up to ⅓ of the Nyquist frequency 1012, and enlarging the power at the higher frequencies 1014. However, this results in the total power reduction on PES 710 as illustrated in FIG. 7.

Figure 11:
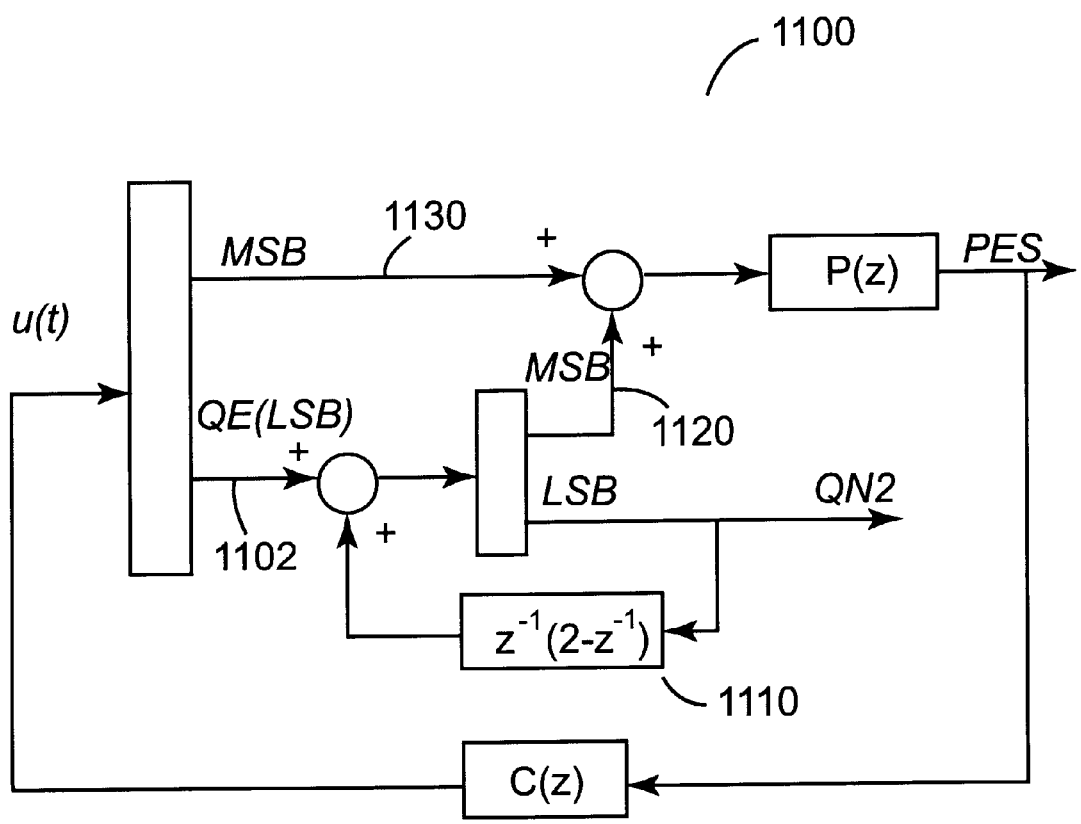
FIG. 11 illustrates a block diagram of a QEF scheme with double integrators wherein more power reduction may be obtained at the lower frequencies.

Those skilled in the art will readily recognize that other QEF structures in accordance with the present invention are possible for different TMR reduction objectives. For example, FIG. 11 illustrates a block diagram 1100 of a QEF scheme with double integrators 1110, in which case more power reduction may be obtained at the lower frequencies. In FIG. 11, the LSB 1102 from the DSP is integrated twice 1110, and the resulting MSB part 1120 is added to the original MSB 1130 of the DSP output before feeding to the DAC. Upon closer inspection, the double integrator QEF 1100 may be seen to again be a feedforward scheme, and the block diagram 1100 in FIG. 11 is equivalent to the block diagram 1200 of FIG. 12.

Figure 12:
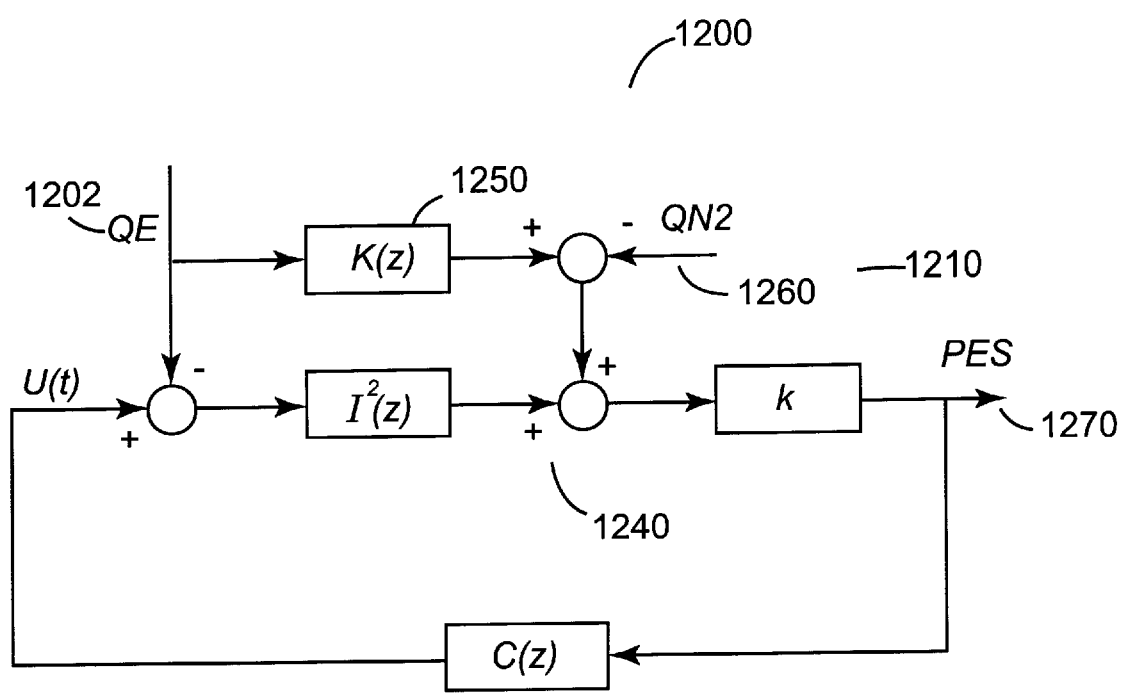
FIG. 12 is an equivalent circuit of the block diagram illustrated in FIG. 11, wherein the double integrator QEF scheme is the optimal feedforward scheme and the prefilter is optimally chosen to minimize the mean square value of PES.

In FIG. 12, the double-integrator plant 1210 is represented as $P(z)=kI^2(z)$ 1240, and $K(z)=I^2(z)$ 1250, where $I(z)$ is again an discrete-time integrator: $I(z)=1/(1-z^{-1})$, QN2 1260 is truncation error (LSB) of QE 1202 after integration. Note that QN2 1260 is white noise with the similar stochastic properties as QE 1202 under the assumptions discussed above.

It can be shown that the double integrator QEF scheme 1200 is the optimal feedforward scheme and that the prefilter $K(z)=I^2(z)$ is optimally chosen to minimize the mean square value of PES 1270 in FIG. 12. The block diagram 1200 in FIG. 12 is equivalent to the block diagram 1300 in FIG. 13. Comparing this block diagram 1300 with the block diagram 400 in FIG. 4, one can easily see that the disturbance entering the system becomes:

$$QE_2(z) = \frac{QN(z)}{I^2(z)} = (1-z^{-1})^2 QN_2(z),$$

i.e., the quantization noise is reshaped by the filter which is now a double discrete-time differentiator.

The power spectrum density of the filtered disturbance $QE_2$ 1310 is as follows:

$$S_{QE_1}(\omega) = \|1-e^{-j\omega}\|^4 S_{QE}(\omega) = 16\sin^4\left(\frac{\omega}{2}\right)\cdot\frac{q^2}{12}.$$

Figure 13:
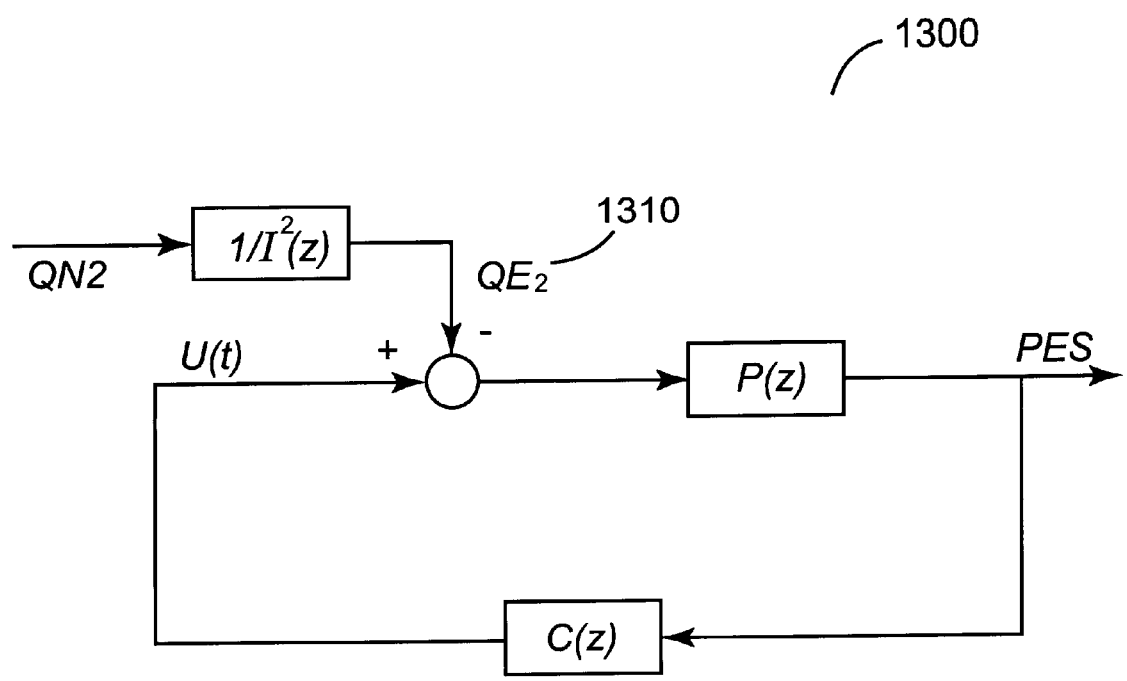
FIG. 13 is an equivalent circuit of the block diagram illustrated in FIG. 12.
Figure 14:
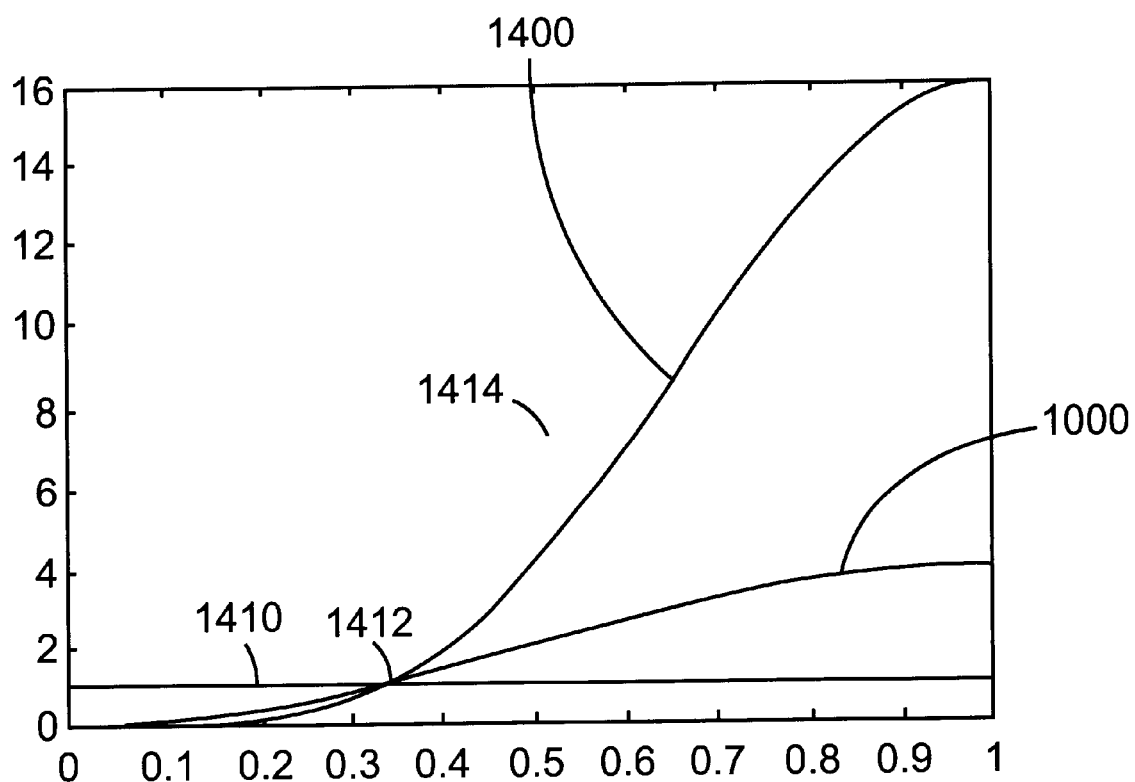
FIG. 14 illustrates the power spectrum density of the filtered disturbance $QE_2$ of FIG. 13.
Figure 15:
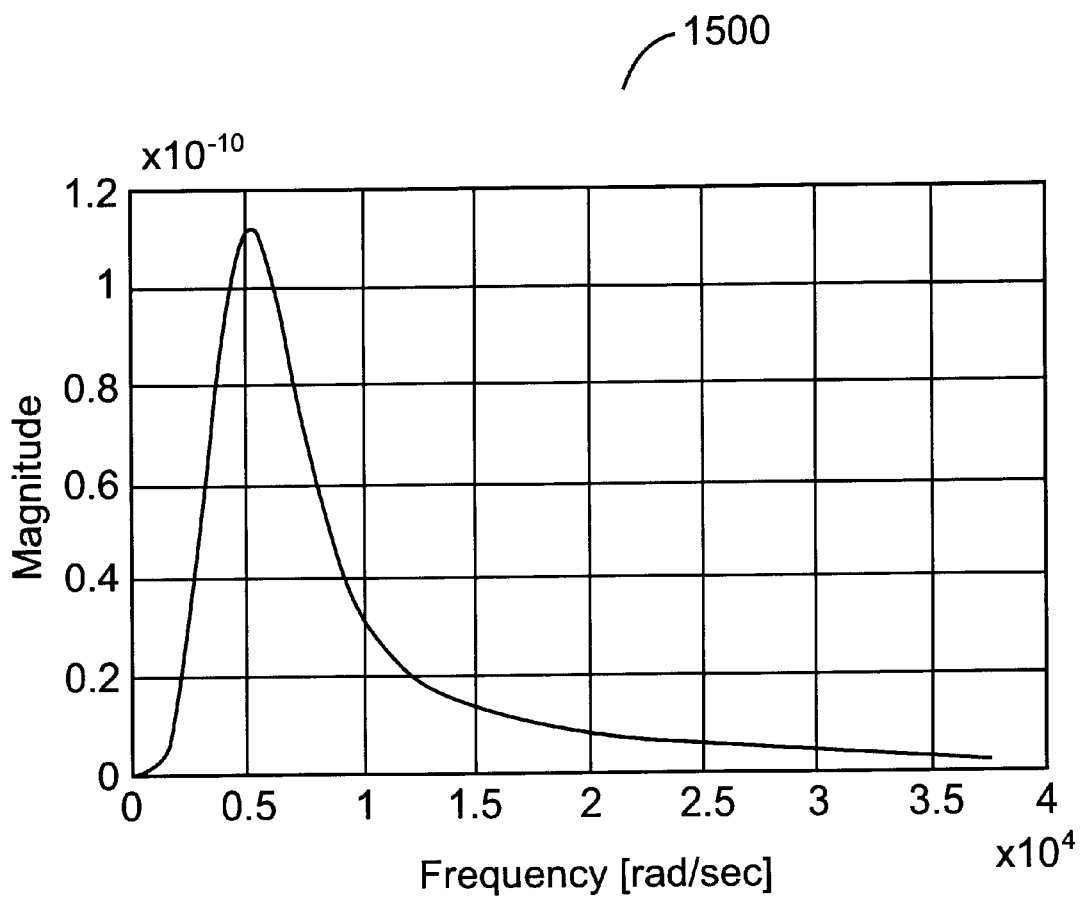
FIG. 15 shows the ideal power spectrums of TMR due to quantization error with the double-integrator.

FIG. 14 illustrates the power spectrum density 1400 of the filtered disturbance $QE_2$ 1310 of FIG. 13. From FIG. 14, the filtering process can be observed to again reduce the power density at the lower frequencies 1410 up to ⅓ of the Nyquist frequency 1412, and enlarge the power at the higher frequencies 1414. This reduction as well as enlargement is even greater than that with the single integrator 1000 of FIG. 10 superimposed on FIG. 14. FIG. 15 shows the ideal power spectrums 1500 of TMR due to quantization error with the double-integrator. The mean square value of TMR in this case is $$2.5587\times 10^{-11}\cdot\frac{q^2}{12}.$$

Figure 16:
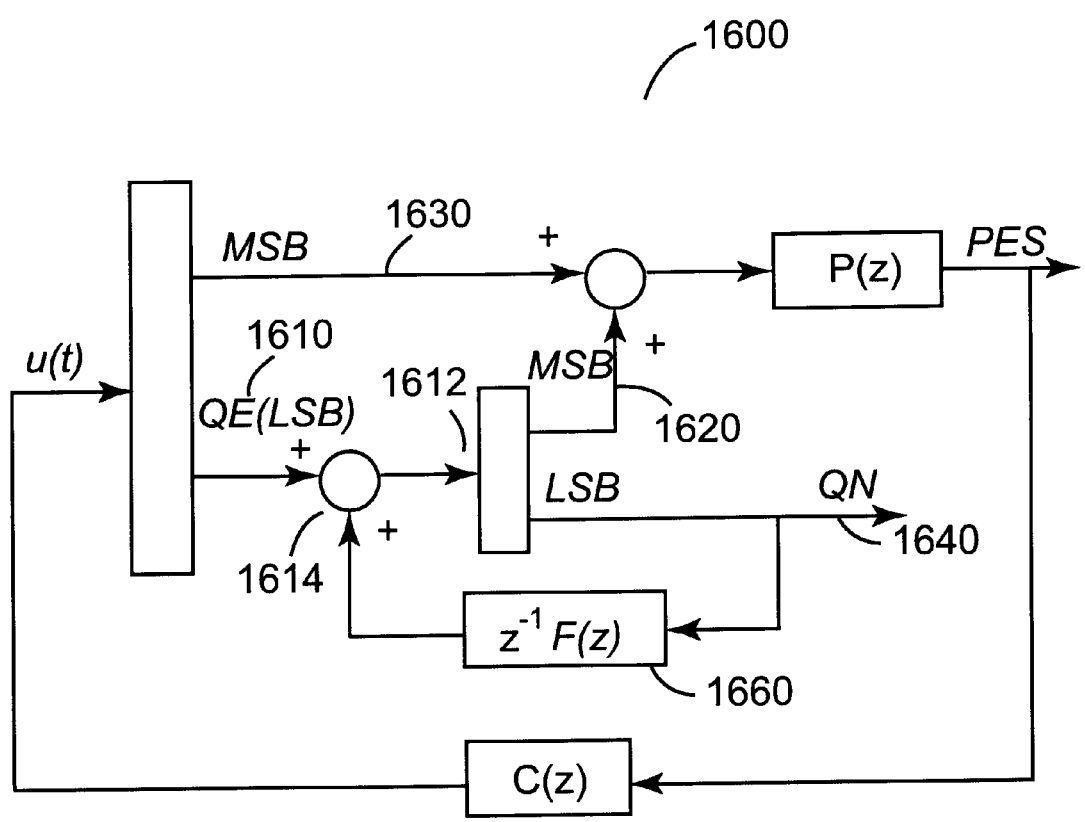
FIG. 16 illustrates a general structure for the QEF methods according to the present invention.

Next, constraints on the QEF technique with the consideration of the general QEF structure in accordance with the present invention needs to be considered. In the above discussion, single and double integrator QEF schemes were introduced. A general structure 1600 for QEF schemes is shown in FIG. 16. With this technique, the quantization (or roundoff) error 1610 is monitored 1612 and accumulated 1614 in the DSP. When sufficient error has accumulated, i.e., an MSB is generated 1620, it is added to the original MSB 1630 feeding the DAC. Note that the feedback loop in the error accumulation operation has at least one pure delay so that the operation is implementable.

In the block diagram of FIG. 16, QN 1640 is the truncation error (LSB) of QE after filtering. Note that QN 1640 is white noise with similar stochastic properties to QE as discussed above. In particular, $$S_{QN}(\omega)=S_{QE}(\omega)=q^2/12.$$

However, the constraints and the optimality of the general QEF method must be addressed. Consider the general QEF scheme. 1600 in FIG. 16. In this structure, the feedback loop gain is $z^{-1}F(z)$ 1660, where $F(z)$ is a filter whose transfer function is assumed to be a real rational function which is analytic and bounded in $\{z:\|z\|\geq 1\}$. To explore the limitation of the general QEF schemes, the possible optimal choice of the filter $F(z)$ should be considered. With some block diagram manipulation, one can equivalently transform the block diagram 1600 in FIG. 16 to the feedforward block diagram 1700 in FIG. 17.

Figure 17:
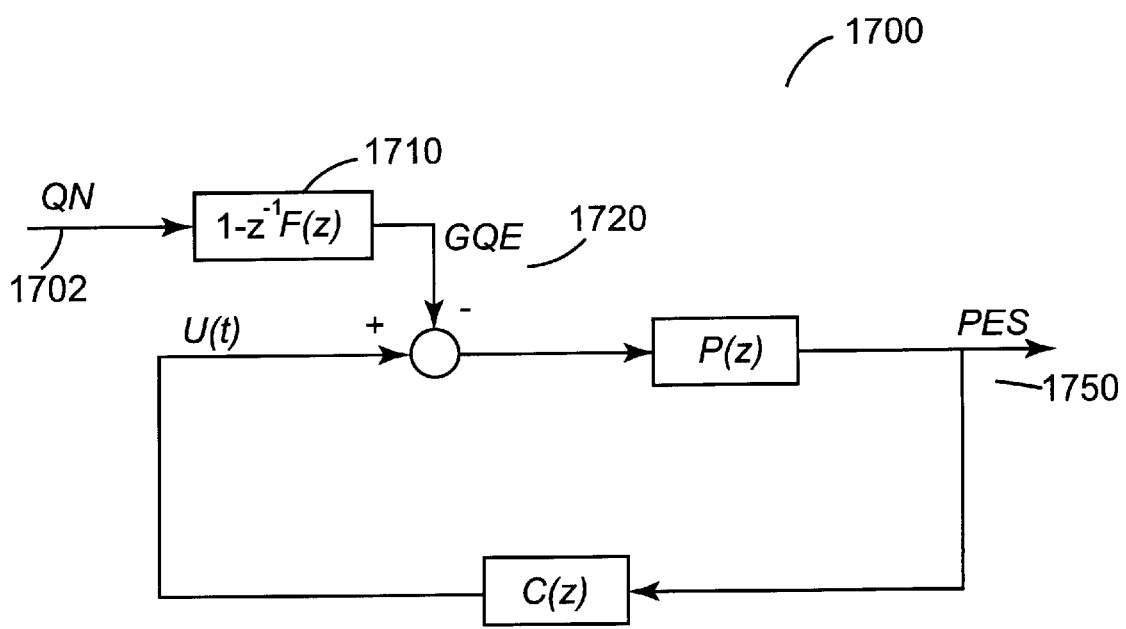
FIG. 17 is the feedforward block diagram of the block diagram illustrated in FIG. 16.

It is noted that in FIG. 17, the quantization noise QN 1702 is reshaped by the general filter, $1-z^{-1}F(z)$ 1710, resulting in disturbance GQE 1720 entering the system as $$GQE(z)=(1-z^{-1}F(z))\cdot QN(z).$$

Therefore, the TMR due to quantization error becomes $$PES(z) = \frac{-P(z)}{1-P(z)C(z)}GQE(z) = H(z)\cdot(1-z^{-1}F(z))\cdot QN(z),$$

where $$H(z) = \frac{-P(z)}{1-P(z)C(z)}$$

is the transfer function from QE to PES in the original block diagram. As QN 1702 is white noise with similar stochastic properties to QE and the power spectrum of PES is $$S_{PES}(\omega)=\|(1-e^{-j\omega}F(e^{j\omega}))H(e^{j\omega})\|^2 S_{QN}(\omega);$$

the variance of PES 1750 can be obtained by the following formulation:

$$E(PES^2(t)) = \frac{1}{\pi}\int_0^\pi S_{PES}(\omega)d\omega = \frac{q^2}{12\pi}\int_0^\pi \|(1-e^{-j\omega}F(e^{j\omega}))H(e^{j\omega})\|^2 d\omega.$$

One can see that $$\min_F E(PES^2(t)) = \min_F\left(\frac{q^2}{12\pi}\int_0^\pi \|(1-e^{-j\omega}F(e^{j\omega}))H(e^{j\omega})\|^2 d\omega\right) = 0,$$

where the minimal is achieved (mathematically) with $F(e^{j\omega})=e^{j\omega}$, or $F(z)=z$.

Therefore, the (mathematically) optimal filter $F(z)$ is a forward shift operator. Thus, the "optimal" feedback loop gain is identity without any delay. However, it is not implementable because the QEF feedback loop should at least contain a delay operator. In the following, whether or not the optimal QEF filter can be approximated by an implementable filter must be considered.

Given $a>0$, for all $z$ satisfying $$\left\|1-\frac{z^{-1}}{a}\right\| < 1,$$

the following expansion follows:

$$z = \frac{1}{z^{-1}} = \frac{1/a}{1-(1-z^{-1}/a)} = \frac{1}{a}\left(1+\left(1-\frac{z^{-1}}{a}\right)+\left(1-\frac{z^{-1}}{a}\right)^2+\left(1-\frac{z^{-1}}{a}\right)^3+\ldots\right).$$

In particular, the n-th order approximation $F(z)$ to $z$ yields:

$$1-z^{-1}F(z) = 1 -$$
$$z^{-1}\frac{1}{a}\left(1+\left(1-\frac{z^{-1}}{a}\right)+\left(1-\frac{z^{-1}}{a}\right)^2+\ldots+\left(1-\frac{z^{-1}}{a}\right)^n\right)$$
$$= \left(1-\frac{z^{-1}}{a}\right)\left(1-\frac{z^{-1}}{a}-\frac{z^{-1}}{a}\left(1-\frac{z^{-1}}{a}\right)-\frac{z^{-1}}{a}\left(1-\frac{z^{-1}}{a}\right)^2-\right.$$
$$\left.\ldots-\frac{z^{-1}}{a}\left(1-\frac{z^{-1}}{a}\right)^{n-1}\right)$$
$$= \ldots$$
$$= \left(1-\frac{z^{-1}}{a}\right)^n$$

In particular, if $a=1$, then the single and double integrator QEF schemes as discussed above recover with $n=1, 2$, respectively. As $n\to\infty$, the feedback loop gain $1-z^{-1}F(z)$ 1710 is convergent to the optimal filter, 0, at the following frequencies:

$$\left\{\omega: \left\|1-\frac{e^{-j\omega}}{a}\right\| < 1, 0 \leq \omega \leq \pi\right\}.$$

Moreover, if $a=1$, the convergent frequencies are $[0, \pi/3]$. This interprets why the power at the lower frequencies ($\omega\epsilon[0, \pi/3)$) is reduced and enlarged at the higher frequencies ($\omega\epsilon[\pi/3, \pi]$) for both single integrator and double integrator QEF. In addition, the larger a is, the bigger the convergent set; in particular, as $a\to\infty$, the convergent frequency set approaches $[0, \pi/2]$.

Next, an illustration of how the power spectrum is shaped by the filter in different cases is provided. Notice that $S_{GQE}(\omega)=\|1-e^{-j\omega}F(e^{j\omega})\|^2 S_{QN}(\omega)$. If $n=1$, then the filter becomes $$1-z^{-1}F(z) = 1-\frac{z^{-1}}{a},$$

which is a scaled integrator, and $$S_{GQE}(\omega) = \left\|1-\frac{e^{-j\omega}}{a}\right\|^2 S_{QN}(\omega) = \left(1+\frac{1}{a^2}-\frac{2}{a}\cdot\cos\omega\right)\cdot S_{QN}(\omega).$$

Figure 18:
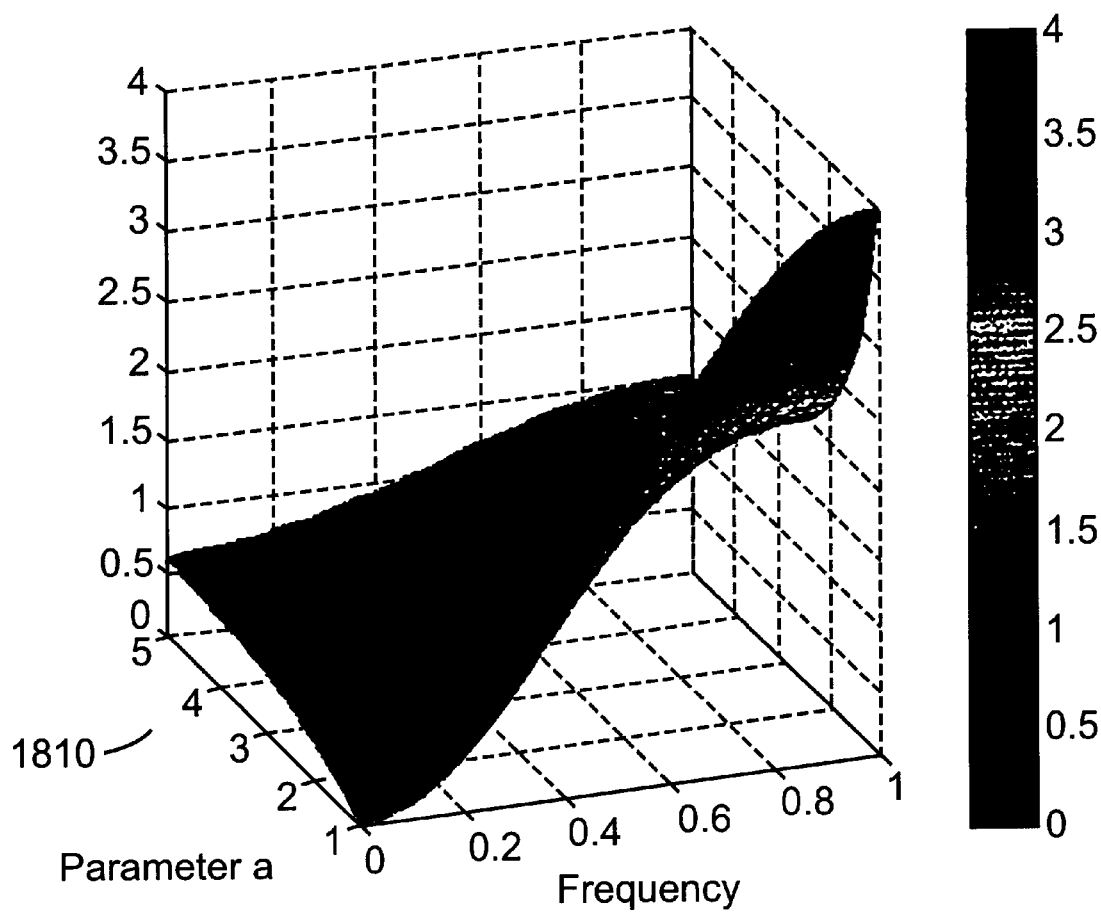
FIG. 18 is a three dimensional plot of power spectrum density against the value a FIG. 19 illustrates the variation of the power spectrum of GQE with variation of n.
Figure 19:
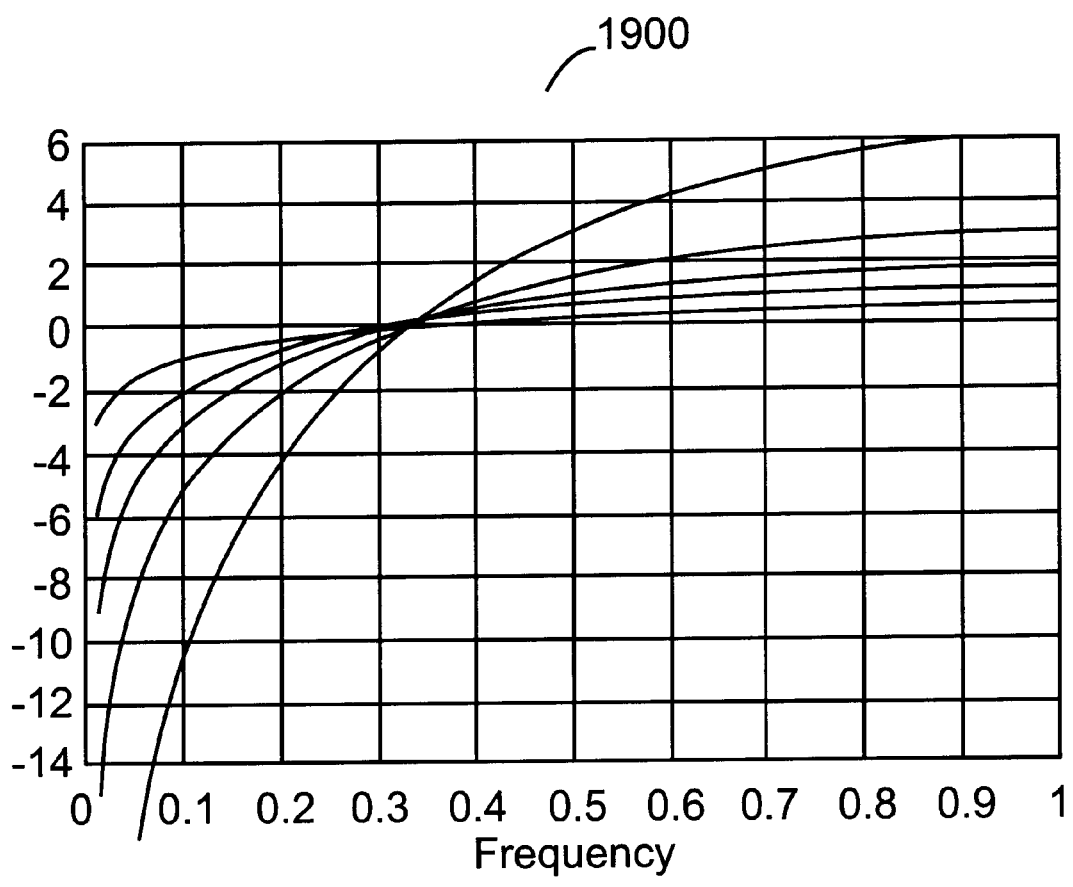

FIG. 18 is a three dimensional plot 1800 of power spectrum density against the value a. FIG. 18 reveals how the power spectrum of GQE varies with the variation of a 1810. For $a=1$, then the filter becomes $1-z^{-1}F(z)=(1-z^{-1})^n$, which is a multiple integrator, $S_{GQE}(\omega)=\|(1-e^{-j\omega})^n\|^2 S_{QN}(\omega)=4^n\sin^{2n}(\omega/2)\cdot S_{QN}(\omega)$. FIG. 19 illustrates how the power spectrum of GQE varies with the variation of n 1900 (each plot representing a different value of n).

In the following, it is assumed that the filter $F(z)$ used in the QEF filter has the following expansion:

$$F(z)=f_1+f_2z^{-1}+f_3z^{-2}+\ldots$$

From the discussion of FIGS. 18 and 19 above, it seems that the reduction of the power of quantization error at some frequencies is at the cost of enlargement of the power at other frequencies. In fact, this is a fundamental limitation for implementable QEFs. This observation is stated in the following Theorem.

QEF Limitation Theorem 1 (Spectrum Shaping)

For all implementable QEF schemes, i.e., the filter $F(z)$ in FIG. 12 is a real rational function analytical and bounded in $\{z:\|z\|\geq 1\}$, the power spectrum $S_{GQE}(\omega)$ of shaped noise, $GQE(Z)=(1-z^{-1}F(z))QN(z)$ with QN being the white quantization noise, always satisfies:

$$\frac{1}{\pi}\cdot\int_0^\pi \ln(S_{GQE}(\omega))d\omega = \text{constant},$$

where the constant is independent of the choice of the filter $F(z)$.

Proof of QEF Limitation Theorem 1 is as follows. As $GQE(Z)=(1-z^{-1}F(z))QN(z)$, $$S_{GQE}(\omega) = \|1-e^{-j\omega}F(e^{j\omega})\|^2 S_{QN}(\omega) = \|1-e^{-j\omega}F(e^{j\omega})\|^2\cdot\frac{q^2}{12}.$$

Therefore, it follows that:

$$\frac{1}{\pi}\cdot\int_0^\pi \ln(S_{GQE}(\omega))d\omega = \frac{1}{\pi}\cdot\int_0^\pi \ln(\|1-e^{-j\omega}F(e^{j\omega})\|^2)d\omega + \ln\left(\frac{q^2}{12}\right) =$$
$$\frac{2}{\pi}\cdot\int_0^\pi \ln(\|1-e^{-j\omega}F(e^{j\omega})\|)d\omega + \ln\left(\frac{q^2}{12}\right).$$

In the following, it is sufficient to show that the first part in the above formula is constant. By assumption, the function $F(z)$ is analytical and bounded in $\{z:\|z\|\geq 1\}$, so is $1-z^{-1}F(z)$; furthermore, the following function, $G(z)=\ln(1-z^{-1}F(z))$, is also analytical and bounded in $\{z:\|z\|\geq 1\}$. It can be shown that $$G(\bar{z}) = \ln(1 - \bar{z}^{-1}F(\bar{z})) = \ln\left(1 - \overline{z^{-1}F(z)}\right) = \overline{\ln(1 - z^{-1}F(z))} = \overline{G(z)}.$$

Then summation of residues of function G(z) inside the unit circle is a real number, denoted as R. On the other hand, $$1 - e^{-j\omega}F(e^{j\omega}) = e^{G(e^{j\omega})} = e^{ReG(e^{j\omega})}e^{ImG(e^{j\omega})}, \text{ then}$$

$$\|1 - e^{-j\omega}F(e^{j\omega})\| = e^{ReG(e^{j\omega})}, \text{ and}$$

$$\ln\|1 - e^{-j\omega}F(e^{j\omega})\| = ReG(e^{j\omega}).$$

Therefore, $$\int_0^\pi \ln(\|1 - e^{-j\omega}F(e^{j\omega})\|)d\omega = \int_0^\pi ReG(e^{j\omega})d\omega =$$

$$Re\int_0^\pi G(e^{j\omega})d\omega = \frac{1}{2}Re\int_0^{2\pi} G(e^{j\omega})d\omega = \frac{1}{2}Re\oint_\gamma G(z)dz =$$

$$\frac{1}{2}Re(2\pi j \cdot \text{summation of residues of } G \text{ inside unit circle } \gamma) =$$

$$\frac{1}{2}Re(2\pi Rj) = 0.$$

Thus, $$\frac{1}{\pi} \cdot \int_0^\pi \ln(S_{GQE}(\omega))d\omega =$$

$$\frac{2}{\pi} \cdot \int_0^\pi \ln(\|1 - e^{-j\omega}F(e^{j\omega})\|)d\omega + \ln\left(\frac{q^2}{12}\right) = \ln\left(\frac{q^2}{12}\right),$$

which is of course a constant.

Figure 20:
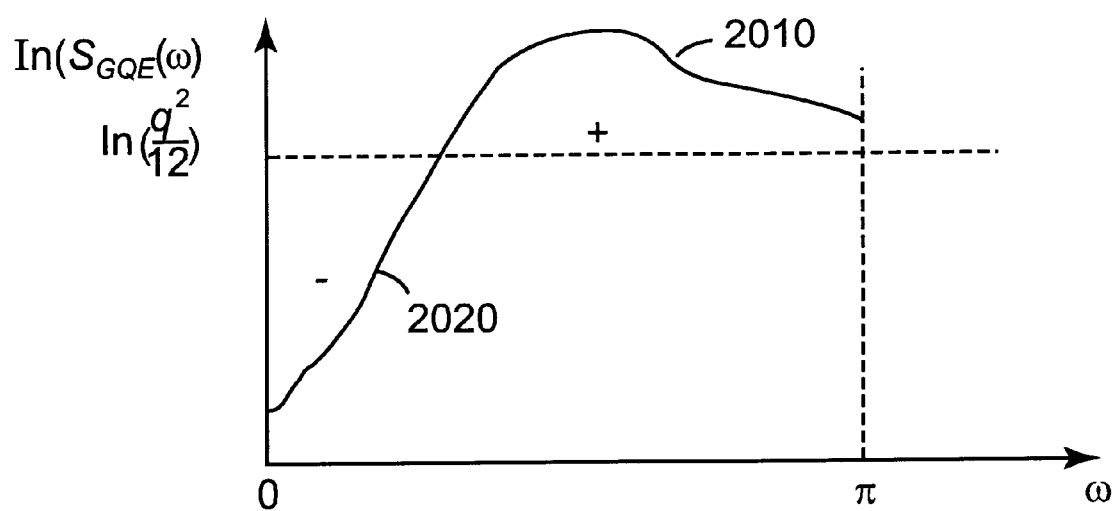
FIG. 20 is a plot of the logarithm of power spectrum density of shaped quantization noise demonstrating that the average is constant.

From the above limitation theorem, one can conclude that for white quantization noises with fixed power spectrum density, the average of the logarithm of power spectrum density of shaped quantization noise is constant, whatever quantization error accumulation algorithm is chosen; i.e., for any QEF scheme, the "+" 2010 and "−" 2020 areas are equal in FIG. 20.

Next, the constraints on TMR reduction will be considered. The PES with the general structure of the QEF filter is represented as follows:

$$PES(z) = H(z) \cdot (1 - z^{-1}F(z)) \cdot QN(z) =: \Theta(z) \cdot QN(z),$$

where H(z) is the transfer function from QE to PES in the original block diagram. The power spectrum of PES is $$S_{PES}(\omega) = \|(1 - e^{-j\omega}F(e^{j\omega}))H(e^{j\omega})\|^2 S_{QN}(\omega),$$

the variance of PES can be obtained by the following formulation:

$$E(PES^2(t)) =$$

$$\frac{q^2}{12\pi}\int_0^\pi \|(1 - e^{-j\omega}F(e^{j\omega}))H(e^{j\omega})\|^2 d\omega = \frac{q^2}{12\pi}\int_0^\pi \|\Theta(e^{j\omega})\|^2 d\omega.$$

If the transfer function $\Theta(z)$ from QE to PES is represented as:

$$\Theta(z) = p_0 + p_1 z^{-1} + p_2 z^{-2} + \ldots$$

i.e., its impulse response is $\{p_i\}_{i=1}^\infty$, then from Parseval's identity, one has $$\frac{1}{\pi}\int_0^\pi \|\Theta(e^{j\omega})\|^2 d\omega = \sum_{i=0}^\infty p_i^2.$$

Let the transfer function of the closed loop system H(z) satisfies:

$$H(z) = z^{-m}\left(h_0 + \frac{b_{k-1}z^{k-1} + \ldots + b_1 z + b_0}{z^k + a_{k-1}z^{k-1} + \ldots + a_1 z + a_0}\right) := z^{-m}H_0(z),$$

for some nonnegative integer m; i.e., there are m pure delays in the closed loop transfer function. Thus, $$H_0(z) = h_0 + \frac{b_{k-1}z^{k-1} + \ldots + b_1 z + b_0}{z^k + a_{k-1}z^{k-1} + \ldots + a_1 z + a_0}$$

$$= h_0 + \frac{b_{k-1}z^{-1} + \ldots + b_1 z^{-(k-1)} + b_0 z^{-k}}{1 + (a_{k-1}z^{-1} + \ldots + a_1 z^{-(k-1)} + a_0 z^{-k})}$$

$$= h_0 + h_1 z^{-1} + \ldots$$

for some $\{h_i\}_{i=1}^\infty$. From the above Parseval's identity, one immediately has the following statement.

QEF Limitation Theorem 2 (TMR Reduction)

For the QEF schemes considered in this section, the mean square value of PES always satisfies $$E(PES^2(t)) \geq \frac{q^2}{12} \cdot h_0^2.$$

Proof of QEF Limitation Theorem 2 is as follows. As the filter F(z) used in the QEF filter has the following expansion:

$$F(z) = f_1 + f_2 z^{-1} + f_3 z^{-2} + \ldots$$

Thus, the transfer function is $$\Theta(z) = H(z) \cdot (1 - z^{-1}F(z)) = z^{-m}H_0(z) \cdot (1 - z^{-1}F(z))$$

$$= z^{-m}(h_0 + h_1 z^{-1} + \ldots)(1 - f_1 z^{-1} - \ldots - f_n z^{-n})$$

$$= h_0 z^{-m} + (h_1 - h_0 f_1)z^{-(m+1)} + \ldots$$

Therefore, the impulse response $\{p_i\}_{i=1}^\infty$ of $\Theta(z)$ satisfies $p_m = h_0$, thereby providing:

$$\frac{1}{\pi}\int_0^\pi \|\Theta(e^{j\omega})\|^2 d\omega = \sum_{i=0}^\infty p_i^2 \geq p_m = h_0,$$

from which the conclusion follows. The above theorem gives a TMR lower bound using the QEF techniques. Next, the optimal TMR reduction with a given QEF structure will be considered.

Next, an optimal QEF filter with a given QEF structure will be determined to reduce TMR due to quantization noise. In this example, the case where the QEF filter F(z) is an FIR filter will be considered. In this example:

$$F(z) = f_1 + f_2 z^{-1} + \ldots + f_n z^{n-1}, \text{ where } f = [f_n f_{n-1} \ldots f_1]^T.$$

An optimal vector f is needed, such that $$f^* = \underset{f}{\operatorname{argmin}} E(PES^2(t)) = \underset{f}{\operatorname{argmin}} \left( \frac{q^2}{12\pi} \int_0^\pi \|\Theta(e^{j\omega})\|^2 d\omega \right).$$

Because of the structural constraints on the filter, the optimal TMR mean square value will not be 0, and it has a lower bound given by the TMR reduction limitation theorem as described above. To find out the optimal solutions, how the mean square value of PES is computed in terms of the Parseval's identity from transfer function must be shown. First, the time domain (state space) equation for the transfer function must be derived:

$$\Theta(z) = H(z) \cdot (1 - z^{-1} F(z)) = (1 - z^{-1} F(z)) \cdot H(z),$$

where the transfer function of the closed loop system $H(z)$ has m pure delays as given in the previous subsection:

$$H(z) = z^{-m} \left( h_0 + \frac{b_{k-1} z^{k-1} + \ldots + b_1 z + b_0}{z^k + a_{k-1} z^{k-1} + \ldots + a_1 z + a_0} \right) := z^{-m} H_0(z).$$

Denote: $\Theta_0(z) = (1 - z^{-1} F(z)) \cdot H_0(z)$, then $\Theta(z) = z^{-m} \Theta_0(z)$. Next, the system $\Theta_0(z)$ will be examined; it is a cascade interconnected system. The first observation is that:

$$1 - z^{-1} F(z) = 1 - \frac{f_1 z^{n-1} + f_2 z^{n-2} + \ldots + f_n}{z^n},$$

so its state space equation is as follows:

$$\begin{cases} x_1(t+1) = A_1 x_1(t) + B_1 u(t) \\ y_1(t) = C_1 x_1(t) + D_1 u(t) \end{cases}$$

where $$A_1 = \begin{bmatrix} 0 & 1 & 0 & \ldots & 0 \\ 0 & 0 & 1 & \ldots & 0 \\ \vdots & & \ldots & & \vdots \\ 0 & 0 & 0 & \ldots & 1 \\ 0 & 0 & 0 & \ldots & 0 \end{bmatrix}_{n \times n}, \quad B_1 = \begin{bmatrix} 1 \\ 0 \\ 0 \\ \vdots \\ 0 \end{bmatrix}_{n \times 1},$$

$$C_1 = -[\, f_n \quad f_{n-1} \quad \ldots \quad f_1 \,], \quad D_1 = 1.$$

Also the state space equation for the closed loop transfer function $H_0(z)$ is represented as follows:

$$\begin{cases} x_2(t+1) = A_2 x_2(t) + B_2 y_1(t) \\ y(t) = C_2 x_2(t) + D_2 y_1(t) \end{cases}$$

In particular, if $H_0(z)$ is given by the transfer function provided earlier, then its $$A_2 = \begin{bmatrix} 0 & 1 & 0 & \ldots & 0 \\ 0 & 0 & 1 & \ldots & 0 \\ \vdots & & \ldots & & \vdots \\ 0 & 0 & 0 & \ldots & 1 \\ -a_0 & -a_1 & -a_2 & \ldots & -a_{k-1} \end{bmatrix}, \quad B_2 = \begin{bmatrix} 1 \\ 0 \\ 0 \\ \vdots \\ 0 \end{bmatrix}_{k \times 1},$$

$$C_2 = -[\, b_{k-1} \quad b_{k-2} \quad \ldots \quad b_0 \,], \quad D_2 = h_0$$

Therefore, the (n+k)-th order state space realization of the transfer function $\Theta_0(z) = (1 - z^{-1} F(z)) \cdot H_0(z)$ can be represented as follows:

$$\begin{cases} x(t+1) = Ax(t) + Bu(t) \\ y(t) = Cx(t) + Du(t) \end{cases}$$

where state $$x = \begin{bmatrix} x_1 \\ x_2 \end{bmatrix},$$

and coefficient matrix:

$$A = \begin{bmatrix} A_1 & B_1 C_2 \\ 0 & A_2 \end{bmatrix}, \quad B = \begin{bmatrix} B_1 D_2 \\ B_2 \end{bmatrix},$$

$$C = [\, C_1 \quad D_1 C_2 \,], \quad D = D_1 D_2.$$

Now with the state space equation of $\Theta_0(z)$, one can calculate the impulse to response of the system, i.e., for the input. $\{u(t)\}$ with $u(0)=1$, and $u(t)=0$ for $t>0$, the output response $\{y(t)\}$ can be calculated as follows:

$$y(0) = D,$$
$$y(1) = CB,$$
$$y(2) = CAB,$$
$$\vdots$$
$$y(i) = CA^{i-1} B,$$
$$\vdots$$

Therefore, $$\frac{1}{\pi} \int_0^\pi \|\Theta(e^{j\omega})\|^2 d\omega = \frac{1}{\pi} \int_0^\pi \|e^{-jm\omega} \Theta_0(e^{j\omega})\|^2 d\omega =$$

$$\frac{1}{\pi} \int_0^\pi \|\Theta_0(e^{j\omega})\|^2 d\omega = \sum_{i=0}^\infty p_i^2 = \sum_{i=0}^\infty y^2(i)$$

$$= D^2 + \sum_{i=1}^\infty CA^{i-1} BB^T (A^T)^{i-1} C^T$$

$$= D^2 + C \left( \sum_{i=1}^\infty A^{i-1} BB^T (A^T)^{i-1} \right) C^T$$

$$=: D^2 + CLC^T,$$

where $$L = \sum_{i=1}^\infty A^{i-1} BB^T (A^T)^{i-1}.$$

Simple algebraic manipulation yields that L satisfies the following Lyapunov equation:

$$ALA^T - L + BB^T = 0.$$

Therefore, $$E(PES^2(t)) = \frac{q^2}{12\pi}\int_0^\pi \|\Theta(e^{j\omega})\|^2 d\omega = \frac{q^2}{12}(D^2 + CLC^T),$$

where L is the solution of the Lyapunov equation, which is positive definite as the system is stable. In the following, the above value will be minimized by optimally choose the coefficients f of the filter F(z). Notice that in the state space equation, the matrices A, B, and D are known, so L can be solved in the Lyapunov equation; part of the matrix C depends on the unknown, f, in fact, $$C = [C_1 D_1 C_2] = [-f\ C_2].$$

Now, suppose the matrix L>0 is partitioned as $$L = \begin{bmatrix} L_{11} & L_{12} \\ L_{21} & L_{22} \end{bmatrix};$$

also notice that $D = D_1 D_2 = h_0$, one has $$E(PES^2(t)) = \frac{q^2}{12}(D^2 + CLC^T)$$

$$= \frac{q^2}{12}(fL_{11}f^T - 2C_2 L_{12}f^T + C_2 L_{22} C_2^T + h_0^2).$$

Then the optimal solution f* minimizing the above value satisfies:

$$\frac{\partial E(PES^2(t))}{\partial f} = \frac{q^2}{12}(2f^* L_{11} - 2C_2 L_{12}) = 0, \text{ or}$$

$$f^* = C_2 L_{12} L_{11}^{-1}, \text{ and}$$

$$\min_f E(PES^2(t)) = \frac{q^2}{12}(C_2(L_{22} - L_{12} L_{11}^{-1} L_{21})C_2^T + h_0^2).$$

L is positive definite, then $L_{22} - L_{12} L_{11}^{-1} L_{21} > 0$, so $$\min_f E(PES^2(t)) = \frac{q^2}{12}(C_2(L_{22} - L_{12}L_{11}^{-1}L_{21})C_2^T + h_0^2) \geq \frac{q^2}{12} \cdot h_0^2,$$

which again confirms the QEF TMR Limitation Theorem.

In summary, to arrive at the optimal reduction algorithm:
1. Construct state space matrices $B_2$, $D_2$, A, and B.
2. Solve the following Lyapunov equation to get the solution $$L = \begin{bmatrix} L_{11} & L_{12} \\ L_{21} & L_{22} \end{bmatrix}; ALA^T - L + BB^T = 0.$$

3. Find the optimal filter coefficients: $f^* = C_2 L_{12} L_{11}^{-1}$.
4. The optimal solution is given by:

$$\min_f E(PES^2(t)) = \frac{q^2}{12}(C_2(L_{22} - L_{12}L_{11}^{-1}L_{21})C_2^T + h_0^2).$$

Above, the constraints of the QEF methods according to the present invention have been examined, and a bound for achievable TMR reduction was given. Next, it will be shown that the lower bound for TMR can be achieved for minimum phase systems where the loop transfer functions have at least one delay.

First consider the servo system block diagram in FIG. 4. Suppose the plant considered has the following transfer function:

$$P(z) = z^{-m} \cdot P_0(z) := z^{-m} \cdot \frac{p_0(1 + z^{-1}N(z^{-1}))}{1 + z^{-1}M(z^{-1})},$$

and the servo controller designed can be represented as:

$$C(z) = z^{-s} \cdot \frac{c_0(1 + z^{-1}R(z^{-1}))}{1 + z^{-1}S(z^{-1})},$$

where m and s are some nonnegative integers, denoting the pure delays in plant and controller, $h_0$ and $p_0$ are nonzero numbers, and N(·), D(·), R(·), and S(·) are polynomials. The closed loop transfer function from the quantization error is as follows:

$$H(z) = \frac{-P(z)}{1 - P(z)C(z)}$$

$$= \frac{z^{-m} p_0 (1 + z^{-1}N(z^{-1}))(1 + z^{-1}S(z^{-1}))}{(1 + z^{-1}M(z^{-1}))(1 + z^{-1}S(z^{-1})) - z^{-(m+s)} p_0 c_0 (1 + z^{-1}N(z^{-1}))(1 + z^{-1}R(z^{-1}))}$$

$$=: z^{-m} p_0 \cdot \frac{1 + z^{-1}\Phi(z^{-1})}{1 + z^{-1}\Psi(z^{-1})}$$

$$= h_m z^{-m} + h_{m+1} z^{-(m+1)} + \cdots$$

if m+s>0, where $\Phi(\cdot)$ and $\Psi(\cdot)$ are some polynomials and $h_m = p_0$. In the following, H(z) is assumed to have a minimum phase.

From the QEF TMR limitation theorem discussed above, the mean square value of the TMR satisfies the following:

$$E(PES^2(t)) \geq \frac{q^2}{12} \cdot h_m^2 = \frac{q^2}{12} \cdot p_0^2,$$

if any of the QEF schemes introduced above are used. In fact, if either m or s is a positive integer, then the above TMR lower bound is achievable with a modification of the QEF scheme.

Figure 21:
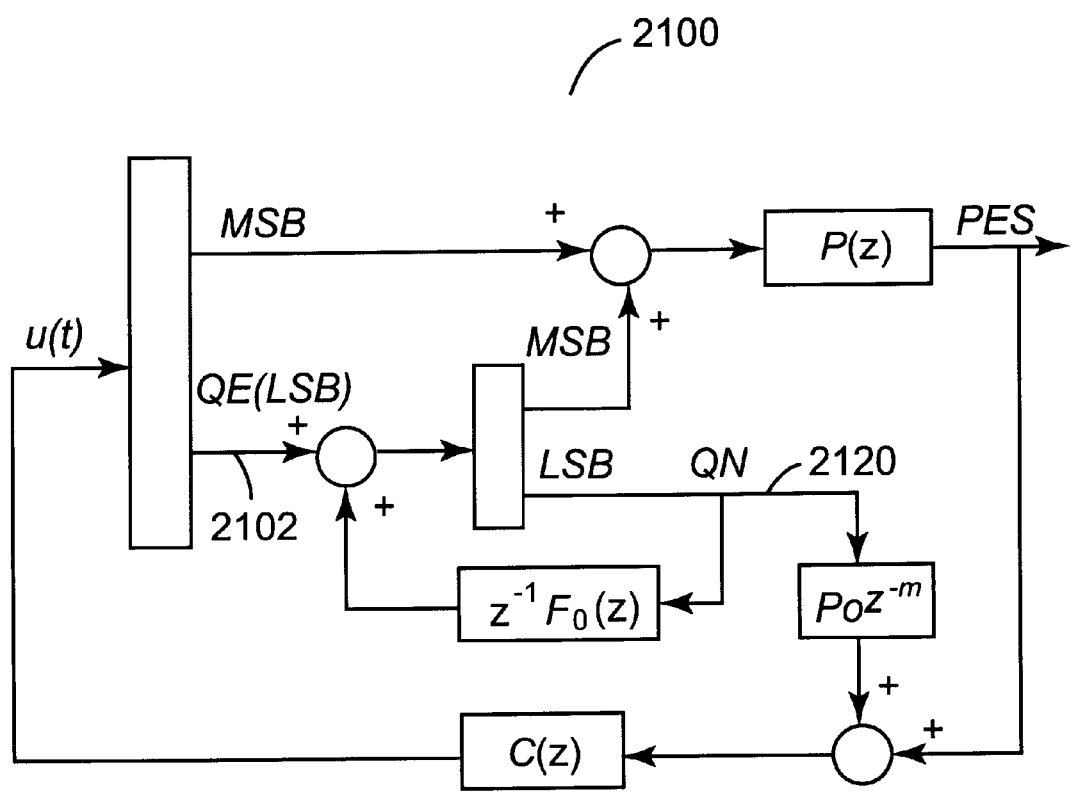
FIG. 21 is a modified block diagram of the QEF method wherein the TMR lower bound is achieved.

In fact, the modified QEF scheme 2100 shown in FIG. 21 can accomplish this task. In that block diagram 2100, F0(z) is a filter has the same properties discussed above with reference to FIGS. 6–15. It is dependent on the plant as follows:

$$F_0(z) = \frac{M(z^{-1}) - N(z^{-1})}{1 + z^{-1}N(z^{-1})}.$$

Note that $$P(z) = \frac{p_0 z^{-m}}{1 - z^{-1} F_0(z^{-1})}.$$

A similar argument to that described above with reference to FIG. 8 implies that the signal QN 2120 in FIG. 21 is white noise and has the same stochastic properties as the quantization error QE 2102; and $$S_{QN}(\omega) = S_{QE}(\omega) = \frac{q^2}{12}.$$

Figure 22:
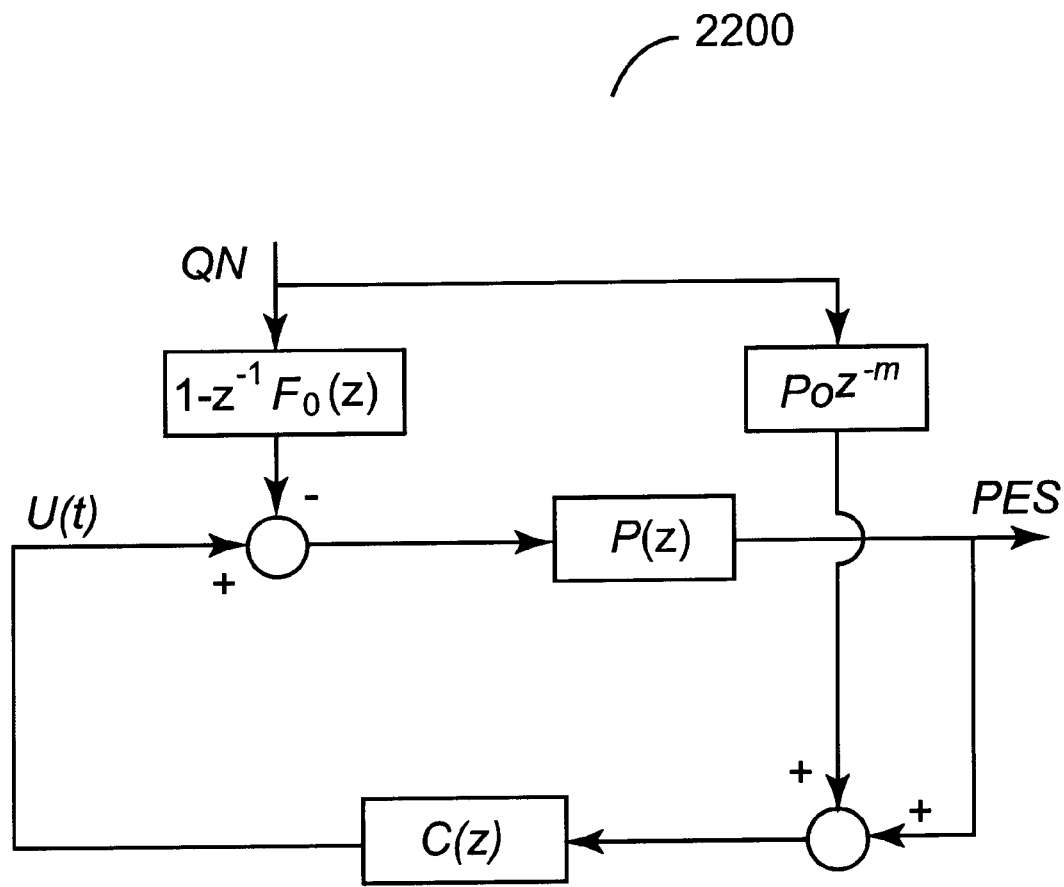
FIG. 22 is an equivalent circuit of the block diagram illustrated in FIG. 21.

It is easy to see that the block diagram 2100 in FIG. 21 is equivalent to the block diagram 2200 in FIG. 22. From the block diagram 2200, one can easily have that $$PES(z) = p_0 z^{-m} \cdot QN(z),$$

which is independent of the controller C(s), and is a white noise, and $$E(PES^2(t)) = \frac{q^2}{12\pi} \int_0^\pi \|p_0 e^{-jm\omega}\|^2 d\omega = \frac{q^2}{12} \cdot p_0^2,$$

which is the lower bound given in the TMR reduction theorem.

To see how this scheme is related to the scheme described above with reference to FIGS. 6–15, one can equivalently represent the block diagram in FIG. 22 with the block diagram in FIG. 16 with $$F(z) = F_0(z) + p_0 z^{-(m-1)} C(z) =$$
$$\frac{M(z^{-1}) - N(z^{-1})}{1 + z^{-1} N(z^{-1})} + z^{-(m+s-1)} \cdot \frac{c_0 p_0 (1 + z^{-1} R(z^{-1}))}{1 + z^{-1} S(z^{-1})}.$$

And the noise filter in FIG. 17 is as follows $$1 - z^{-1} F(z) = 1 - z^{-1} F_0(z) - p_0 z^{-m} C(z) = \frac{p_0 z^{-m}}{P(z)} - p_0 z^{-m} C(z) = \frac{p_0 z^{-m}}{H(z)}.$$

Notice that if the closed loop map H(z) has a minimum phase, i.e., it has stable zeros, then PES can be calculated as $$PES(z) = (1 - z^{-1} F(z)) \cdot H(z) \cdot QN(z) = \frac{p_0 z^{-m}}{H(z)} \cdot H(z) \cdot QN(z) = p_0 z^{-m} QN(z),$$

where the above zero-pole cancellation is allowable because they are stable.

From the above discussion, it can be concluded that if the closed loop system is minimum phase and there is at least one pure delay in the loop transfer function, it can be seen then that the modified QEF scheme can achieve the lower bound for the TMR with the QEF schemes introduced above with reference to FIGS. 6–15, and the resulting TMR is white noise.

Figure 23:
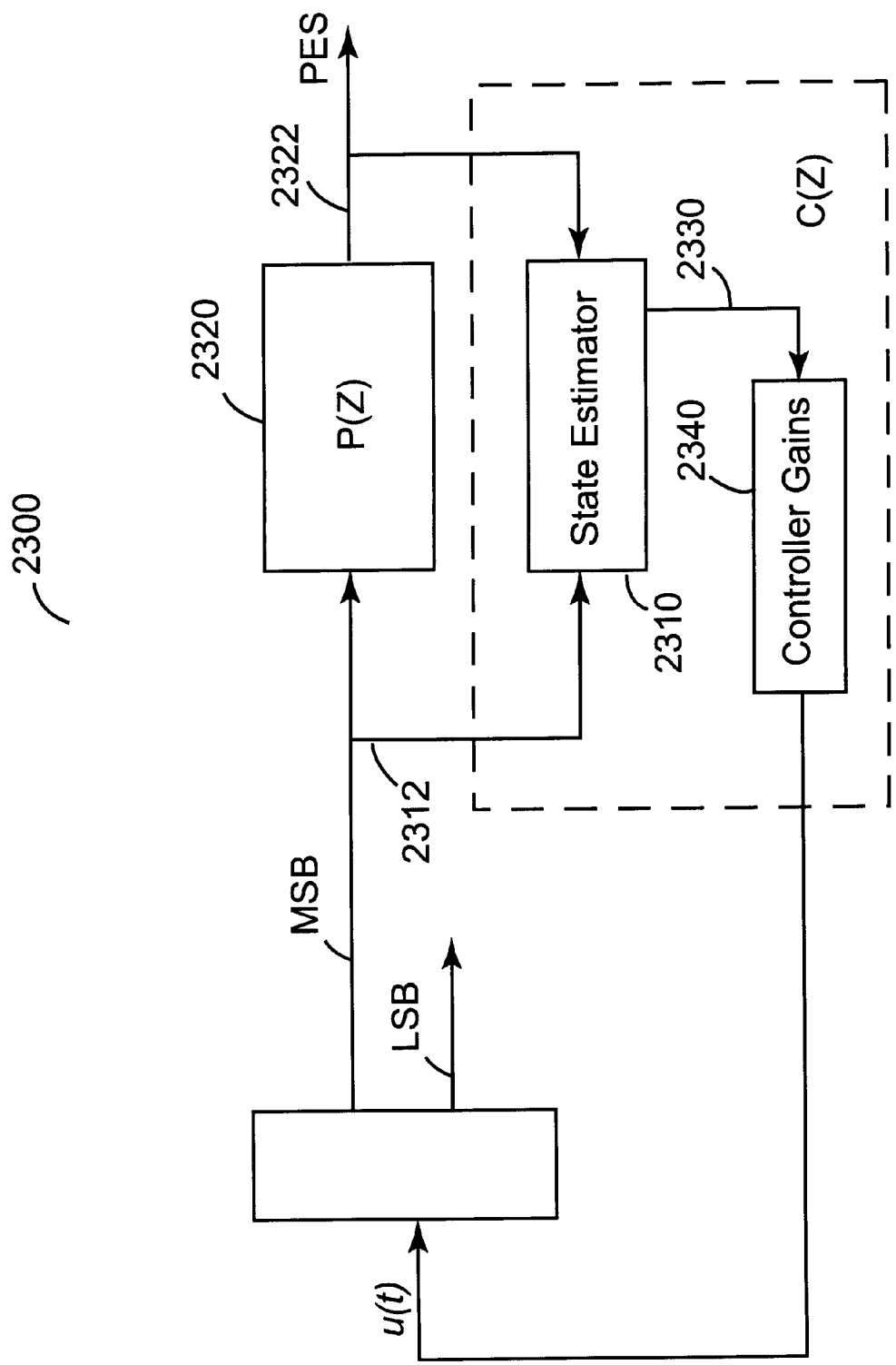
FIG. 23 is a block diagram illustrating a servo control method based on state estimation.

FIG. 23 is a block diagram 2300. illustrating a servo control method based on state estimation. In FIG. 23, the state estimator 2310 is driven with the most significant bits 2312 that are sent to the DAC 2320. The state estimator 2310 also monitors the PES signal 2322. The state estimator 2310 generates a signal 2330 that then is used to drive the controller gains 2340. In FIG. 23, the power spectrum density function of the TMR is reduced at all frequencies of interest by driving the state estimator 2310 with the most significant bits 2312 that are sent to the DAC 2320. Those skilled in the art will recognize that by using both the quantization error feedback methods described above and the DAC-output driven estimator method illustrated with reference to FIG. 23, more even more TMR reduction is possible.

Figure 24:
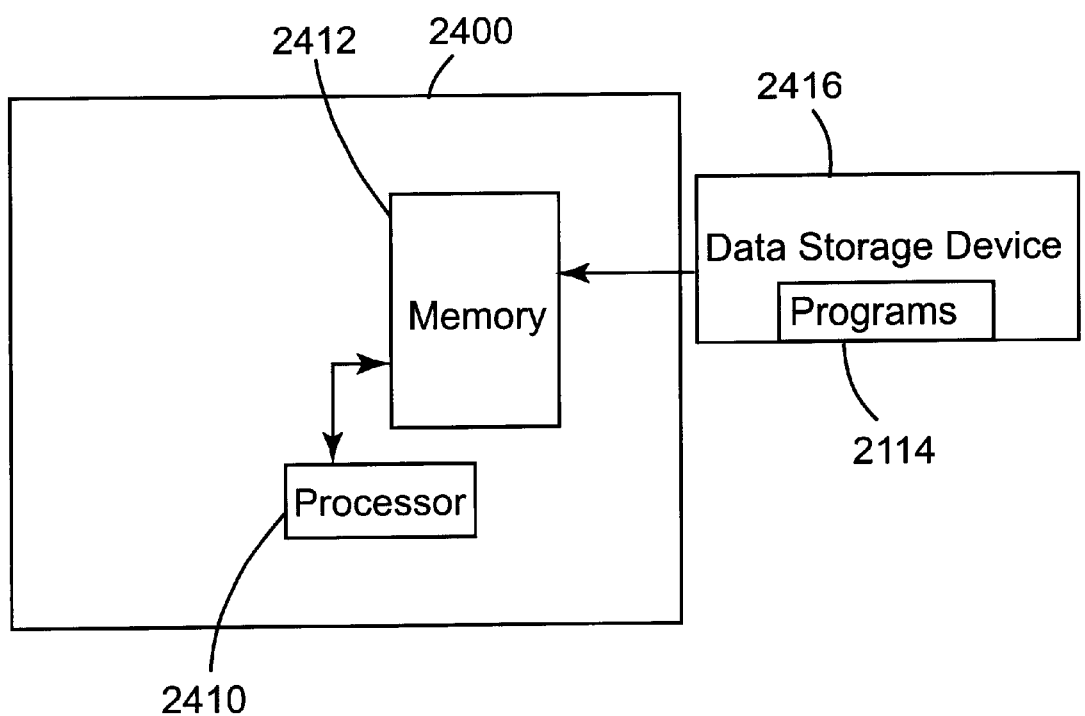
FIG. 24 illustrates a block diagram of a controller that is configured to execute the quantization error feedback method in accordance with the present invention.

FIG. 24 illustrates a block diagram of a controller 2400 that is configured to execute the quantization error feedback method in accordance with the present invention. The controller 2400 includes a processor 2410 and memory 2412. The processor 2410 executes one or more computer programs, which are represented in FIG. 10 by the window 2414. Generally, the computer programs 2414 may be tangibly embodied in a computer-readable medium or carrier, e.g. one or more of the fixed and/or removable data storage devices 2416, or other data storage or data communications devices. The computer programs 2414 may be loaded from the data storage devices 2416 into the memory 2412 for execution by the processor as 2410 discussed above. The computer programs 2414 comprise instructions which, when read and executed by the processor 2410, causes the controller 2400 to perform the steps necessary to execute the steps or elements of the present invention.

Although an exemplary controller configuration is illustrated in FIG. 24, those skilled in the art will recognize that any number of different configurations performing similar functions may be used in accordance with the present invention.

In summary, the present invention provides a QEF method to reduce the TMR of HDD due to DAC quantization noise without altering or degrading the other desired servo performances. The constraints of the QEF methods have been analyzed, and a lower bound for the mean square value of TMR using QEF schemes has been described. The optimal QEF filter which minimizes the mean square value of TMR has been derived, and an algorithm has been provided. Moreover, the QEF method of the present invention may be conveniently implemented in DSP without significantly increasing computational time.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for reducing a control error for a servo loop due to quantization noise of a digital-to-analog converter driving a plant, the quantization noise resulting from the digital-to-analog converter having a lower precision than a processor driving the digital-to-analog converter, the method comprising:

providing control signals for controlling a plant, the control signals each having a precision of a first predetermined number of bits further comprising a first group of most significant bits and at least one least significant bit;

accumulating the at least one least significant bit until a new most significant bit is generated;

adding the new most significant bit to a first group of most significant bits to generate a modified plant control signal; and providing the modified plant control signal to the plant to control operation of the plant.

2. The method of claim 1 wherein the accumulating the at least one least significant bit until a new most significant bit is generated further comprises feeding the at least one least significant bit through a feedback loop having a feedback loop gain until the new most significant bit is generated.

3. The method of claim 2 wherein the feedback loop gain is $z^{-1}F(z)$, where F(z) is a filter whose transfer function is assumed to be a real rational function which is analytic and bounded in $\{z: \|z\| \geq 1\}$.

4. The method of claim 3 wherein the feedback loop gain is a single integrator.

5. The method of claim 3 wherein the feedback loop gain is a double integrator.

6. The method of claim 3 wherein the filter F(z) provides a power spectrum $S_{GQE}(\omega)$ of shaped noise that always satisfies $$\frac{1}{\pi} \cdot \int_0^\pi \ln(S_{GQE}(\omega)) d\omega = K,$$

where K is a constant and $\omega$ is the angular frequency in radians per second.

7. The method of claim 1 wherein the control error is track misregistration, the track misregistration being measured according to a position error signal (PES), the mean square value of PES satisfying $$E(PES^2(t)) \geq \frac{q^2}{12} \cdot h_0^2,$$

where $q=2^l c$ with q being a quantization amount, $h_0$ being a closed loop response of a transfer function between a quantization error (QE) and PES, and c being the quantization resolution in the processor, and l being a number representing the at least one least significant bit.

8. The method of claim 1 wherein the control error is track misregistration, the track misregistration being measured according to a position error signal (PES), a minimum of the mean square value of PES being derived by the processor according to a method comprising:

constructing state space matrices $B_2$, $D_2$, A, and B;

solving $ALA^T - L + BB^T = 0$ to get the solution $$L = \begin{bmatrix} L_{11} & L_{12} \\ L_{21} & L_{22} \end{bmatrix},$$

wherein L satisfies the matrix equation $ALA^T - L + BB^T = 0$;

finding the optimal filter coefficients: $f^* = C_2 L_{12} L_{11}^{-1}$, wherein $f^*$ is the solution to a minimum expected value for $PES^2(t)$; and solving for the minimum of the mean square value of PES given by:

$$\min_f E(PES^2(t)) = \frac{q^2}{12}(C_2(L_{22} - L_{12}L_{11}^{-1}L_{21})C_2^T + h_0^2),$$

wherein q is a quantization amount denoting one full least significant bit for a single bit span, $h_0$ is a closed loop response of a transfer function between a quantization error (QE) and PES, $C_2$ is a space matrix, and $C^T_2$ is the transposed matrix of $C_2$.

9. The method of claim 1 wherein the mean square value of PES achieves the lower bound, $$\frac{q^2}{12} \cdot h_0^2,$$

by additionally feeding forward the filtered QEF noise QN to the controller input when there is at least one sampling delay in the servo loop.

10. The method of claim 1 further comprising driving a state estimator with the most significant bits and a position error signal to reduce the power spectrum density function of the track misregistration at predetermined frequencies.

11. A actuator system, comprising:

a voice coil motor being driven by a digital-to-analog converter;

a processor providing a control signal for controlling the voice coil motor, the control signals each having a precision of a first predetermined number of bits further comprising a first group of most significant bits and at least one least significant bit; and a quantization error feedback circuit for reducing a control error of a servo loop due to quantization noise of the digital-to-analog converter driving the voice coil motor, the quantization noise resulting from the digital-to-analog converter having a lower precision than the processor driving the digital-to-analog converter, the quantization error feedback circuit providing control signals for controlling a plant, the control signals each having a precision of a first predetermined number of bits further comprising a first group of most significant bits and at least one least significant bit, accumulating the at least one least significant bit until a new most significant bit is generated, adding the new most significant bit to a first group of most significant bits to generate a modified plant control signal and providing the modified plant control signal to the plant to control operation of the plant.

12. The actuator system of claim 11 wherein the quantization error circuit feeds the at least one least significant bit through a feedback loop having a feedback loop gain until the new most significant bit is generated.

13. The actuator system of claim 12 wherein the feedback loop gain comprises $z^{-1}F(z)$, where F(z) is a filter whose transfer function is assumed to be a real rational function which is analytic and bounded in $\{z: \|z\| \geq 1\}$.

14. The actuator system of claim 13 wherein the feedback loop gain is a single integrator.

15. The actuator system of claim 13 wherein the feedback loop gain is a double integrator.

16. The actuator system of claim 13 wherein the filter F(z) provides a power spectrum $S_{GQE}(\omega)$ of shaped noise that always satisfies $$\frac{1}{\pi} \cdot \int_0^\pi \ln(S_{QGE}(\omega)) d\omega = K,$$

where K is a constant and $\omega$ is the angular frequency in radians per second.

17. The actuator system of claim 11 wherein the control error is track misregistration, the track misregistration being measured according to a position error signal (PES), the mean square value of PES satisfying $$E(PES^2(t)) \geq \frac{q^2}{12} \cdot h_0^2,$$

where $q=2^l c$ with q being a quantization amount, $h_0$ being a closed loop response of a transfer function between a quantization error (QE) and PES, and c being the quantization resolution in the processor, and l being a number representing the at least one least significant bit.

18. The actuator system of claim 11 wherein the control error is track misregistration, the track misregistration being measured according to a position error signal (PES), a minimum of the mean square value of PES being derived by the processor, the system comprising:

state space matrices $B_2$, $D_2$, A, and B are constructed;
equation $ALA^T - L + BB^T = 0$ is solved to get the solution $$L = \begin{bmatrix} L_{11} & L_{12} \\ L_{21} & L_{22} \end{bmatrix},$$

wherein L satisfies the matrix equation $ALA^T - L + BB^T = 0$;
optimal filter coefficients are found by: $f^* = C_2 L_{12} L_{11}^{-1}$, wherein $f^*$ is the solution to a minimum expected value for $PES^2(t)$; and
a minimum of the mean square value of PES is solved and given by:

$$\min_f E(PES^2(t)) = \frac{q^2}{12}(C_2(L_{22} - L_{12}L_{11}^{-1}L_{21})C_2^T + h_0^2),$$

wherein q is a quantization amount, $h_0$ is a closed loop response of a transfer function between a quantization error (QE) and PES, $C_2$ is a space matrix, and $C^T_2$ is the transposed matrix of $C_2$.

19. The actuator system of claim 18 wherein the mean square value of PES achieves the lower bound, $$\frac{q^2}{12} \cdot h_0^2,$$

by additionally feeding forward the filtered QEF noise QN to the controller input when there is at least one sampling delay in the servo loop.

20. The actuator system of claim 11 further comprising a state estimator, the drive state estimator being driven with the most significant bits and a position error signal to reduce the power spectrum density function of the track misregistration at predetermined frequencies.

21. A data storage system, comprising:
a data storage disk;
a motor for rotating the data storage disk; and
an actuator system for moving a transducer relative to the rotating data storage disk, the actuator system further comprising:
a voice coil motor being driven by a digital-to-analog converter;
a processor providing a control signal for controlling the voice coil motor, the control signals each having a precision of a first predetermined number of bits further comprising a first group of most significant bits and at least one least significant bit; and
a quantization error feedback circuit for reducing a control error for a servo loop due to quantization noise of the digital-to-analog converter driving the voice coil motor, the quantization noise resulting from the digital-to-analog converter having a lower precision than the processor driving the digital-to-analog converter, the quantization error feedback circuit providing each of the first group of most significant bits to the voice coil motor to control operation of the voice coil motor, accumulating the at least one least significant bit until a new most significant bit is generated, and adding the new most significant bit to a first group of most significant bits before being provided to the voice coil motor.

22. The data storage system of claim 21 wherein the quantization error circuit feeds the at least one least significant bit through a feedback loop having a feedback loop gain until the new most significant bit is generated.

23. The data storage system of claim 22 wherein the feedback loop gain comprises $z^{-1}F(z)$, where $F(z)$ is a filter whose transfer function is assumed to be a real rational function which is analytic and bounded in $\{z: \|z\| \geq 1\}$.

24. The data storage system of claim 23 wherein the feedback loop gain is a single integrator.

25. The data storage system of claim 23 wherein the feedback loop gain is a double integrator.

26. The data storage system of claim 23 wherein the filter F(z) provides a power spectrum $S_{GQE}(\omega)$ of shaped noise that always satisfies $$\frac{1}{\pi} \cdot \int_0^\pi \ln(S_{GQE}(\omega)) d\omega = K,$$

where K is a constant and $\omega$ is the angular frequency in radians per second.

27. The data storage of claim 21 wherein the control error is track misregistration, the track misregistration being measured according to a position error signal (PES), the mean square value of PES satisfying $$E(PES^2(t)) \geq \frac{q^2}{12} \cdot h_0^2,$$

where $q=2^l c$ with q being a quantization amount, $h_0$ being a closed loop response of a transfer function between a quantization error (QE) and PES, and c being the quantization resolution in the processor, and l being a number representing the at least one least significant bit.

28. The data storage of claim 21 wherein the control error is track misregistration, the track misregistration being measured according to a position error signal (PES), a minimum of the mean square value of PES being derived by the processor, the system comprising:

state space matrices $B_2$, $D_2$, A, and B are constructed;
equation $ALA^T - L + BB^T = 0$ is solved to get the solution $$L = \begin{bmatrix} L_{11} & L_{12} \\ L_{21} & L_{22} \end{bmatrix},$$

wherein L satisfies the matrix equation $ALA^T - L + BB^T = 0$;
optimal filter coefficients are found by: $f^* = C_2 L_{12} L_{11}^{-1}$, wherein $f^*$ is the solution to a minimum expected value for $PES^2(t)$; and
a minimum of the mean square value of PES is solved and given by:

$$\min_f E(PES^2(t)) = \frac{q^2}{12}(C_2(L_{22} - L_{12}L_{11}^{-1}L_{21})C_2^T + h_0^2),$$

wherein q is a quantization amount, $h_0$ is a closed loop response of a transfer function between a quantization error (QE) and PES, $C_2$ is a space matrix, and $C^T_2$ is the transposed matrix of $C_2$.

29. The data storage system of claim 28 wherein the mean square value of PES achieves the lower bound, $$\frac{q^2}{12} \cdot h_0^2,$$

by additionally feeding forward the filtered QEF noise QN to the controller input when there is at least one sampling delay in the servo loop.

30. The data storage system of claim 21 further comprising a state estimator, the drive state estimator being driven with the most significan[009f] bits and a position error signal to reduce the power spectrum density function of the track misregistration at predetermined frequencies.

31. An article manufacture for reducing track misregistration due to quantization noise of a digital-to-analog converter driving a plant in a servo loop, the quantization noise resulting from the digital-to-analog converter having a lower precision than a processor driving the digital-to-analog converter, the article of manufacture comprising a computer readable medium having instructions for causing a computer to perform a method comprising:
  providing control signals for controlling a plant, the control signals each having a precision of a first predetermined number of bits further comprising a first group of most significant bits and at least one least significant bit;
  accumulating the at least one least significant bit until a new most significant bit is generated;
  adding the new most significant bit to a first group of most significant bits to generate a modified plant control signal; and
  providing the modified plant control signal to the plant to control operation of the plant.

32. The article of manufacture of claim 31 wherein the accumulating the at least one least significant bit until a new most significant bit is generated further comprises feeding the at least one least significant bit through a feedback loop having a feedback loop gain until the new most significant bit is generated.

33. The article of manufacture of claim 32 wherein the feedback loop gain is $z^{-1}F(z)$, where F(z) is a filter whose transfer function is assumed to be a real rational function which is analytic and bounded in $\{z: \|z\| \geq 1\}$.

34. The article of manufacture of claim 33 wherein the feedback loop gain is a single integrator.

35. The article of manufacture of claim 33 wherein the feedback loop gain is a double integrator.

36. The article of manufacture of claim 33 wherein the filter F(z) provides a power spectrum $S_{GQE}(\omega)$ of shaped noise that always satisfies $$\frac{1}{\pi} \cdot \int_0^\pi \ln(S_{GQE}(\omega))\,d\omega = K,$$

where K is a constant and $\omega$ is the angular frequency in radians per second.

37. The article of manufacture of claim 31 wherein the control error is track misregistration, the track misregistration being measured according to a position error signal (PES), the mean square value of PES satisfying $$E(PES^2(t)) \geq \frac{q^2}{12} \cdot h_0^2,$$

where $q=2^l c$ with g is a quantization amount, $h_0$ is a closed loop response of a transfer function between a quantization error (QE) and PES, and c being the quantization resolution denoting one-half least significant bit in the processor, and l being a number representing the at least one least significant bit.

38. The article of manufacture of claim 31 wherein the control error is track misregistration, the track misregistration being measured according to a position error signal (PES), a minimum of the mean square value of PES being derived by the processor, comprising:
  constructing state space matrices $B_2$, $D_2$, A, and B;
  solving $ALA^T - L + BB^T = 0$ to get the solution $$L = \begin{bmatrix} L_{11} & L_{12} \\ L_{21} & L_{22} \end{bmatrix},$$

wherein L satisfies the matrix equation $ALA^T - L + BB^T = 0$;
  finding the optimal filter coefficients: $f^* = C_2 L_{12} L_{11}^{-1}$, wherein $f^*$ is the solution to a minimum expected value for $PES^2(t)$; and
  solving for the minimum of the mean square value of PES given by:

$$\min_f E(PES^2(t)) = \frac{q^2}{12}(C_2(L_{22} - L_{12}L_{11}^{-1}L_{21})C_2^T + h_0^2),$$

wherein q is a quantization amount, $h_0$ is a closed loop response of a transfer function between a quantization error (QE) and PES, $C_2$ is a space matrix, and $C^T_2$ is the transposed matrix of $C_2$.

39. The article of manufacture of claim 38 wherein the mean square value of PES achieves the lower bound, $$\frac{q^2}{12} \cdot h_0^2,$$

by additionally feeding forward the filtered QEF noise QN to the controller input when there is at least one sampling delay in the servo loop.

40. The article of manufacture of claim 31 further comprising driving a state estimator with the most significant bits and a position error signal to reduce the power spectrum density function of the track misregistration at predetermined frequencies.

41. A method for reducing a control error due to quantization noise of a digital-to-analog converter driving a plant, the quantization noise resulting from the digital-to-analog converter having a lower precision than a processor driving the digital-to-analog converter, the method comprising:
  providing control signals for controlling a plant, the control signals each having a precision of a first predetermined number of bits further comprising a first group of most significant bits and at least one least significant bit; and driving a state estimator with the most significant bits and a position error signal to reduce the power spectrum density function of the track misregistration at predetermined frequencies.

42. The method of claim 41 further comprising accumulating the at least one least significant bit until a new most significant bit is generated;

adding the new most significant bit to a first group of most significant bits to generate a modified plant control signal; and providing the modified plant control signal to the plant to control operation of the plant.

43. The method of claim 42 wherein the accumulating the at least one least significant bit until a new most significant bit is generated further comprises feeding the at least one least significant bit through a feedback loop having a feedback loop gain until the new most significant bit is generated.

44. The method of claim 43 wherein the feedback loop gain is $z^{-1}F(z)$, where $F(z)$ is a filter whose transfer function is assumed to be a real rational function which is analytic and bounded in $\{z: \|z\| \geq 1\}$.

45. The method of claim 44 wherein the feedback loop gain is a single integrator.

46. The method of claim 44 wherein the feedback loop gain is a double integrator.

47. The method of claim 44 wherein the filter $F(z)$ provides a power spectrum $S_{GQE}(\omega)$ of shaped noise that always satisfies $$\frac{1}{\pi} \cdot \int_0^\pi \ln(S_{GQE}(\omega))\,d\omega = K,$$

where K is a constant and $\omega$ is the angular frequency in radians per second.

48. The method of claim 41 wherein the control error is track misregistration, the track misregistration being measured according to a position error signal (PES), the mean square value of PES satisfying $$E(PES^2(t)) \geq \frac{q^2}{12} \cdot h_0^2,$$

where $q=2^l c$ with q is a quantization amount, $h_0$ is a closed loop response of a transfer function between a quantization error (QE) and PES, and c being the quantization resolution in the processor, and l being a number representing the at least one least significant bit.

49. The method of claim 41 wherein the control error is track misregistration, the track misregistration being measured according to a position error signal (PES), a minimum of the mean square value of PES being derived by the processor according to a method comprising:

constructing state space matrices $B_2$, $D_2$, A, and B;

solving $ALA^T - L + BB^T = 0$ to get the solution $$L = \begin{bmatrix} L_{11} & L_{12} \\ L_{21} & L_{22} \end{bmatrix},$$

wherein L satisfies the matrix equation $ALA^T - L + BB^T = 0$;

finding the optimal filter coefficients: $f^* = C_2 L_{12} L_{11}^{-1}$, wherein $f^*$ is the solution to a minimum expected value for $PES^2(t)$; and solving for the minimum of the mean square value of PES given by:

$$\min_f E(PES^2(t)) = \frac{q^2}{12}(C_2(L_{22} - L_{12}L_{11}^{-1}L_{21})C_2^T + h_0^2),$$

wherein q is a quantization amount, $h_0$ is a closed loop response of a transfer function between a quantization error (QE) and PES, $C_2$ is a space matrix, and $C^T_2$ is the transposed matrix of $C_2$.

50. The method of claim 49 wherein in the mean square value of PES achieves the lower bound, $$\frac{q^2}{12} \cdot h_0^2,$$

by additionally feeding forward the filtered QEF noise QN to the controller input when there is at least one sampling delay in the servo loop.

51. A data storage system, comprising:

a data storage disk;

a motor for rotating the data storage disk; and an actuator system for moving a transducer relative to the rotating data storage disk, the actuator system further comprising:

a voice coil motor being driven by a digital-to-analog converter;

a digital signal processor providing a control signal for controlling the voice coil motor, the control signals each having a precision of a first predetermined number of bits further comprising a first group of most significant bits and at least one least significant bit, wherein the processor reduces a control error for a servo loop due to quantization noise of the digital-to-analog converter driving the voice coil motor, the processor accumulating the at least one least significant bit until a new most significant bit is generated, and adding the new most significant bit to a first group of most significant bits before being provided to the voice coil motor.

* * * * *